US012243041B2

United States Patent
Nie et al.

(10) Patent No.: US 12,243,041 B2
(45) Date of Patent: Mar. 4, 2025

(54) PAYMENT METHOD AND SYSTEM BASED ON CLOUD APPLICATION INSTANCE, AND RELATED DEVICE

(71) Applicant: Huawei Cloud Computing Technologies Co., Ltd., Guizhou (CN)

(72) Inventors: Kaixuan Nie, Gui'an (CN); Wei Huang, Gui'an (CN); Qiangqiang Liu, Shenzhen (CN); Chunyang Liu, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 17/976,564

(22) Filed: Oct. 28, 2022

(65) Prior Publication Data

US 2023/0056518 A1     Feb. 23, 2023

Related U.S. Application Data

(63) Continuation of application No. PCT/CN2021/090767, filed on Apr. 28, 2021.

(30) Foreign Application Priority Data

Apr. 30, 2020   (CN) .......................... 202010366058.3
Jun. 30, 2020   (CN) .......................... 202010616848.2

(51) Int. Cl.
    *G06Q 20/32*     (2012.01)
    *G06F 21/31*     (2013.01)
    (Continued)

(52) U.S. Cl.
    CPC ......... *G06Q 20/3267* (2020.05); *G06F 21/31* (2013.01); *G06Q 20/16* (2013.01); *G06Q 20/40145* (2013.01)

(58) Field of Classification Search
    CPC ..................................................... G06Q 20/00
    See application file for complete search history.

(56) References Cited

U.S. PATENT DOCUMENTS 10,692,085 B2 *  6/2020   Zagarese .......... G06Q 20/40145
2008/0255991 A1   10/2008   Wang
(Continued)

FOREIGN PATENT DOCUMENTS

CN     103186851 A     7/2013
CN     103380423 A     10/2013
(Continued)

OTHER PUBLICATIONS

Managing NFC payment applications through cloud computing Published in: 2012 International Conference for Internet Technology and Secured Transactions (pp. 772-777) Authors: P. Pourghomi • G. Ghinea (Year: 2012).*

(Continued)

*Primary Examiner* — Bruce I Ebersman
(74) *Attorney, Agent, or Firm* — Conley Rose, P.C.

(57) ABSTRACT

A payment method includes a cloud application instance sending an order and a device identity to a payment management node. The payment method further includes the payment management node recording a correspondence between the order and the device identity. The payment method further includes the cloud application instance sending an order payment request to a terminal device. The payment method further includes the terminal device sending, to the payment management node based on the order payment request, an order obtaining request carrying the device identity. The payment method further includes the payment management node obtaining the order from the correspondence based on the device identity carried in the order obtaining request, and sending the order to the termi- (Continued)

nal device. The payment method further includes terminal device receiving and processing the order.

14 Claims, 21 Drawing Sheets

(51) Int. Cl.
*G06Q 20/16* (2012.01)
*G06Q 20/40* (2012.01)

(56) References Cited

U.S. PATENT DOCUMENTS

| | | | |
|---|---|---|---|
| 2009/0276771 A1* | 11/2009 | Nickolov | G06Q 30/04 718/1 |
| 2012/0066670 A1 | 3/2012 | McCarthy | |
| 2012/0124368 A1* | 5/2012 | Driessen | G09C 5/00 713/153 |
| 2013/0268357 A1* | 10/2013 | Heath | G06Q 10/10 726/26 |
| 2015/0032634 A1* | 1/2015 | D'Agostino | H04L 9/3263 705/71 |
| 2015/0106213 A1 | 4/2015 | Guen | |
| 2016/0294806 A1 | 10/2016 | Du | |
| 2017/0372310 A1* | 12/2017 | Narasimhan | H04L 63/0853 |
| 2018/0262354 A1* | 9/2018 | Vuornos | H04L 12/1496 |
| 2019/0147089 A1 | 5/2019 | Megahed et al. | |
| 2021/0097527 A1* | 4/2021 | Filteau-Tessier | G06Q 20/401 |

FOREIGN PATENT DOCUMENTS

| | | |
|---|---|---|
| CN | 103595809 A | 2/2014 |
| CN | 104380325 A | 2/2015 |
| CN | 104717261 A | 6/2015 |
| CN | 105187362 A | 12/2015 |
| CN | 105187431 A | 12/2015 |
| CN | 105530293 A | 4/2016 |
| CN | 105741092 A | 7/2016 |
| CN | 105825378 A | 8/2016 |
| CN | 109150696 A | 1/2019 |
| CN | 109325342 A | 2/2019 |
| CN | 110135823 A | 8/2019 |
| CN | 110689334 A | 1/2020 |
| CN | 110796440 A | 2/2020 |
| CN | 112101922 * | 10/2020 |
| CN | 1031186851 * | 10/2020 |
| EP | 2184698 A1 | 5/2010 |
| WO | 2018163087 A1 | 9/2018 |

OTHER PUBLICATIONS

A Secure Cloud-Based Payment Model for M-Commerce Published in: 2013 42nd International Conference on Parallel Processing (pp. 1082-1086) Authors: Tao-Ku Chang [+details] (Year: 2013).*
Cloud Service Security & application vulnerability IEEE (Year: 2015).*
A wireless payment system, IEEE (Year: 2005).*
Lin Peng, "Discussion on key technologies of 5G cloud gaming platform networking", China Internet, Editorial Office Mailbox , Issue 2020, Jan. 20, 2020, with an English abstract, 8 pages.

* cited by examiner

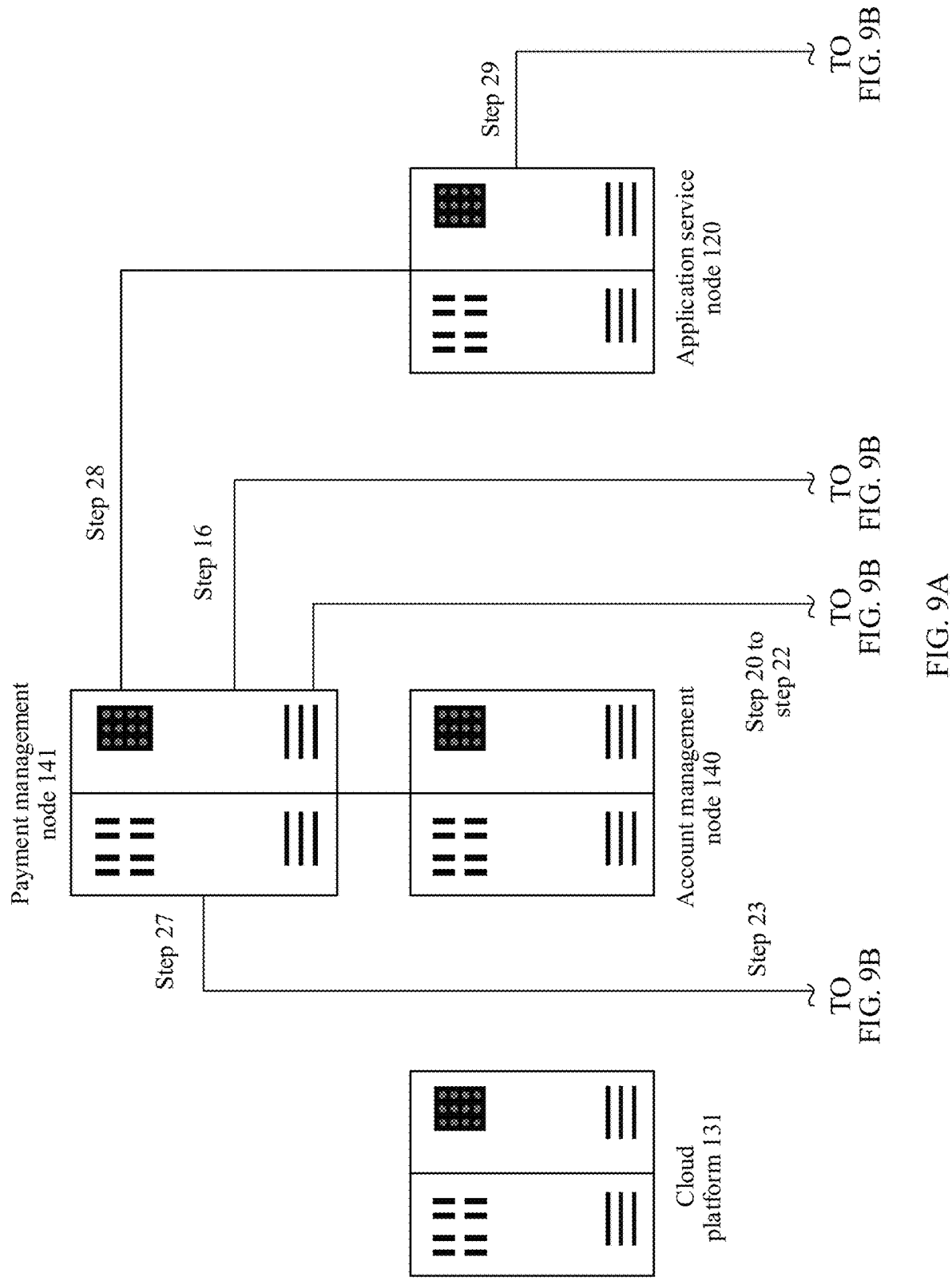

PAYMENT METHOD AND SYSTEM BASED ON CLOUD APPLICATION INSTANCE, AND RELATED DEVICE

CROSS-REFERENCE TO RELATED APPLICATIONS

This is a continuation of International Patent Application No. PCT/CN2021/090767 filed on Apr. 28, 2021, which claims priority to Chinese Patent Application No. 202010366058.3 filed on Apr. 30, 2020 and Chinese Patent Application No. 202010616848.2 filed on Jun. 30, 2020. All of the aforementioned patent applications are hereby incorporated by reference in their entireties.

TECHNICAL FIELD

This application relates to the field of cloud technologies, and in particular, to a payment method and system based on a cloud application instance, and a related device.

BACKGROUND

With rapid development of cloud computing technologies and various network infrastructures, a traditional internet technology (IT) service architecture is gradually migrating to a public cloud, and more and more service applications are redesigned and used based on a public cloud architecture. In the public cloud architecture, user applications are installed in a cloud application instance. The cloud application instance can transmit audio and video images rendered during application operation to a terminal device in a form of audio and video streams. The terminal device only needs to display the received audio and video streams to a user, such that the applications can be truly download-free, installation-free, and tap-to-use.

However, when the user performs a payment operation using the cloud application instance, for example, when an application is an online game application, a user needs to perform recharging in the online game. Because the cloud application instance is disposed in a public cloud, if a terminal device transmits financial information (for example, information such as a third-party payment account and password) of the user to the cloud application instance, such that the cloud application instance can pay an order using a third-party payment platform, the cloud application instance of the public cloud may obtain the financial information of the user in this process. When the user stops renting the cloud application instance, the financial information of the user may be recorded in the cloud application instance. If another user rents the cloud application instance, the financial information entered by the user last time is obtained, causing a great security risk. Based on this, currently the user cannot perform any payment operation using the cloud application instance, causing inconvenience to the user.

SUMMARY

This application provides a payment method and system based on a cloud application instance, and a related device, to implement secure payment by a user using the cloud application instance.

According to a first aspect, a payment method based on a cloud application instance is provided, where the method includes the following steps: The cloud application instance first sends an order and a device identity to a payment management node, such that the payment management node can record a correspondence between the order and the device identity. The cloud application instance then sends an order payment request to a terminal device. The terminal device sends, to the payment management node based on the order payment request, an order obtaining request carrying the device identity. The payment management node obtains the order from the previous correspondence based on the device identity in the order obtaining request, and then sends the order to the terminal device. The terminal device receives and processes the order.

During specific implementation, the device identity is a unique character string, may be specifically a device feature code of the cloud application instance, and is a unique code used by a cloud platform to distinguish between cloud application instances. A specific form of the device identity is not limited in this application. The order includes a price of a selling object and a payment collection account. The selling object may be a commodity purchased by a user in an application. The price is an amount payable of the order. The payment collection account may be a payment collection account of a supplier of an application service node. During specific implementation, the order may further include information used to describe the order, such as an order number, an application account of a user, a commodity name of a selling object, a discount, and a purchase quantity.

According to the method described in the first aspect, the cloud application instance sends a to-be-paid order of the user to the payment management node, and then the terminal device held by the user obtains the order from the payment management node, and pays the order using a payment application running on the terminal device. In this entire payment process, the cloud application instance does not receive any payment-related information of the user, for example, a payment account and a payment password of a payment platform. This can prevent the cloud application instance from recording a payment password, and ensure security of payment by the user using the cloud application instance.

In a possible implementation, before the cloud application instance sends the order and the device identity to the payment management node, the method further includes the following steps: The cloud application instance establishes a connection channel to the terminal device. The terminal device obtains the device identity of the cloud application instance from the connection channel.

During specific implementation, the connection channel may be an event pipeline or may be another connection channel between the cloud application instance and the terminal device that is used to transmit data. This is not specifically limited in this application.

It should be noted that the cloud application instance sends the order and the device identity to the payment management node through an encrypted transmission channel with very high security. The encrypted transmission channel may be implemented using an application layer (layer 7) protocol of an open systems interconnection model (OSI), for example, an existing mature and reliable communications protocol in the industry, such as the HTTP protocol and the FTP protocol. Moreover, further encryption processing is performed when data is transmitted using the application layer protocol, for example, an AES128 encryption algorithm or an RSA encryption algorithm is used, and even if the data is intercepted by an unexpected receiver, transmission content of this request cannot be easily deciphered, thereby avoiding loss of privacy information such as an order of a user when the cloud application instance sends the order and the device identity to the payment management node, and improving security of a payment process.

In the foregoing implementation, only anonymized status information or action information is transmitted between the cloud application instance and the terminal device through an event pipeline, and no password information related to user privacy is transmitted. In addition, data is transmitted between the cloud application instance and the payment management node using a mature and secure communications protocol. Therefore, a transmission process of an entire payment process is very secure, and privacy data of the user is effectively secured.

In a possible implementation, after the terminal device receives the order, the terminal device displays the order, then obtains an identity of a payment platform selected by the user and a payment account and a payment password of the user on the payment platform, and then sends the identity of the payment platform, the payment account, and the payment password to the payment management node.

Optionally, the payment platform that is displayed by the terminal device to the user and that can be selected by the user is a payment platform that is bound by the user using the cloud platform before the cloud application instance first sends the order and the device identity to the payment management node. Simply speaking, the user may first bind a payment account of a payment platform commonly used by the user to a cloud platform account, and the terminal device records the binding relationship. In this way, when receiving the order and displaying the order to the user, the terminal device may display the previously bound payment platform on the terminal device for the user to select. After the user selects the payment platform, the terminal device obtains, based on the previously recorded binding relationship, the payment account of the payment platform previously bound by the user, and then obtains a payment password corresponding to the payment account of the payment platform from the user. If the user sets a default payment platform for payment, the terminal device may directly obtain a payment password of the default payment platform from the user, and then send an identity of the default payment platform, and a payment account and a payment password of the default payment platform to the payment management node.

During specific implementation, because the payment account and the payment password of the payment platform of the user also belong to the privacy information of the user, when sending the payment account and the payment password of the payment platform to the payment management node, the terminal device may encrypt the payment account and the payment password of the payment platform to generate a serial number, and then send the serial number to the payment management node for processing. The payment management node sends prepayment information including the serial number to a payment platform, the payment platform may decrypt the serial number to obtain the payment account and the payment password of the user, thereby further improving security of the payment process.

In the foregoing implementation, after obtaining the order from the payment management node, the user terminal may first determine whether order information is correct, and select a payment platform for payment when determining that the order information is correct. In this way, the payment method based on a cloud application instance provided in this application is more widely applicable, and user experience is improved.

In a possible implementation, after the terminal device sends the identity of the payment platform, the payment account, and the payment password to the payment management node, the payment management node sends the payment account, the payment password, the payment collection account and the price of the selling object that are recorded in the order to the payment platform based on the identity of the payment platform. When successfully verifying the payment account based on the payment password, the payment platform deducts fees from the payment account and sends first payment success information to the payment management node, the payment management node sends second payment success information to the application service node, and the application service node records, based on the second payment success information, that the order takes effect.

In the foregoing implementation, after the terminal device pays the order using the payment platform and the payment succeeds, the payment management node receives the first payment success information sent by the payment platform, and the payment management node may send the second payment success information to the application service node, such that the application service node can record that the order takes effect. In this entire order payment and order effective process, the payment account and the payment password of the payment platform of the user do not need to be sent to the cloud application instance, thereby eliminating a possibility that the cloud application instance records the payment account and the payment password of the user, this resolves a problem that there is a security risk when a user pays an order using a cloud application instance.

In a possible implementation, after the terminal device sends the identity of the payment platform, the payment account, and the payment password to the payment management node, the payment management node may also send prepayment information to the corresponding payment platform based on the identity of the payment platform. The prepayment information includes the payment account, the price of the sales object, and the payment collection account. Then, the payment platform generates a transaction serial number based on the prepayment information, and returns the transaction serial number to the payment management node. The payment management node sends the transaction serial number to the terminal device. After obtaining the payment password of the user, the terminal device sends both the payment password and the transaction serial number to the payment platform. The payment platform may verify the payment password based on the transaction serial number, deduct fees from the payment account when the verification succeeds, and send the first payment success information to the payment management node. The payment management node sends the second payment success information to the application service node. The application service node records, based on the second payment success information, that the order takes effect.

In the foregoing implementation, in a process in which the terminal device pays the order, neither the payment management node nor the cloud application instance obtains the payment password of the user, thereby greatly ensuring security of payment by the user using the cloud application instance.

In a possible implementation, the method further includes: The application service node notifies the cloud application instance that the order takes effect.

In a possible implementation, the cloud application instance includes a virtual machine, a container, and a bare metal server.

In a possible implementation, the application service node includes a game server, an education application server, a video application server, a social application server, and a virtual reality application server.

In a possible implementation, the terminal device includes a mobile phone, a tablet computer, a personal computer, a smart television, and a game console.

According to a second aspect, a payment system based on a cloud application instance is provided. The system includes a cloud application instance, a payment management node, and a terminal device. The cloud application instance is configured to send an order and a device identity to the payment management node. The payment management node is configured to record a correspondence between the order and the device identity. The cloud application instance is configured to send an order payment request to the terminal device. The terminal device is configured to send, to the payment management node based on the order payment request, an order obtaining request carrying the device identity. The payment management node is configured to: obtain the order from the correspondence based on the device identity carried in the order obtaining request, and send the order to the terminal device. The terminal device is configured to receive and process the order.

The second aspect or any implementation of the second aspect is a system implementation corresponding to the first aspect or any implementation of the first aspect. A description in the first aspect or any implementation of the first aspect is applicable to the second aspect or any implementation of the second aspect. Details are not described herein again.

According to a third aspect, a payment method based on a cloud application instance is provided. The method includes the following steps: A terminal device receives an order payment request sent by a cloud application instance. The terminal device sends, to a payment management node based on the order payment request, an order obtaining request carrying a device identity of the cloud application instance, where the payment management node records a correspondence between the order and the device identity. The terminal device receives the order sent by the payment management node based on the order obtaining request, and processes the order.

According to the method described in the third aspect, the cloud application instance sends a to-be-paid order of a user to a payment management node, and then a terminal device held by the user obtains the order from the payment management node, and pays the order using a payment application running on the terminal device. In this entire payment process, the cloud application instance does not receive any payment-related information of the user, for example, a payment account and a payment password of a payment platform. This can prevent the cloud application instance from recording a payment password, and ensure security of payment by the user using the cloud application instance.

In a possible implementation, before the terminal device receives the order payment request sent by the cloud application instance, the method further includes the following step: The terminal device establishes a connection channel to the cloud application instance, and obtains the device identity of the cloud application instance from the connection channel.

During specific implementation, the connection channel may be an event pipeline or may be another connection channel between the cloud application instance and the terminal device that is used to transmit data. This is not specifically limited in this application.

In the foregoing implementation, only anonymized status information or action information is transmitted between the cloud application instance and the terminal device through the event pipeline, and no password information related to user privacy is transmitted, such that privacy data of a user is strongly ensured.

In a possible implementation, that the terminal device receives and processes the order includes: The terminal device displays the order, then obtains an identity of a payment platform selected by the user and a payment account and a payment password of the user on the payment platform, and then sends the identity of the payment platform, the payment account, and the payment password to the payment management node.

Optionally, the payment platform that is displayed by the terminal device to the user and that can be selected by the user is a payment platform that is bound by the user using the cloud platform before the cloud application instance first sends the order and the device identity to the payment management node. Simply speaking, the user may first bind a payment account of a payment platform commonly used by the user to a cloud platform account, and the terminal device records the binding relationship. In this way, when receiving the order and displaying the order to the user, the terminal device may display the previously bound payment platform on the terminal device for the user to select. After the user selects the payment platform, the terminal device may obtain, based on the previously recorded binding relationship, the payment account of the payment platform previously bound by the user, and then obtain a payment password corresponding to the payment account of the payment platform from the user. If the user sets a default payment platform for payment, the terminal device may directly obtain a payment password of the default payment platform from the user, and then send an identity of the default payment platform, and a payment account and a payment password of the default payment platform to the payment management node.

During specific implementation, because the payment account and the payment password of the payment platform of the user also belong to the privacy information of the user, when sending the payment account and the payment password of the payment platform to the payment management node, the terminal device may encrypt the payment account and the payment password of the payment platform to generate a serial number, and then send the serial number to the payment management node for processing. The payment management node sends prepayment information including the serial number to a payment platform, the payment platform may decrypt the serial number to obtain the payment account and the payment password of the user, thereby further improving security of the payment process.

In the foregoing implementation, after obtaining the order from the payment management node, the user terminal may first determine whether order information is correct, and select a payment platform for payment when determining that the order information is correct. In this way, the payment method based on a cloud application instance provided in this application is more widely applicable, and user experience is improved.

According to a fourth aspect, a terminal device is provided. The terminal device includes: a receiving module, configured to receive an order payment request sent by a cloud application instance; an obtaining module, configured to send, to a payment management node based on the order payment request, an order obtaining request carrying a device identity of the cloud application instance, where the payment management node records a correspondence between the order and the device identity; a receiving module, configured to receive the order sent by the payment management node based on the order obtaining request; and a processing module, configured to process the order.

Any one of the fourth aspect or the implementations of the fourth aspect is an apparatus implementation corresponding to the third aspect or any implementation of the third aspect. A description in the fourth aspect or any implementation of the fourth aspect is applicable to the third aspect or any implementation of the third aspect. Details are not described herein again.

According to a fifth aspect, a payment method based on a cloud application instance is provided. The method includes the following steps: A payment management node receives an order and a device identity that are sent by the cloud application instance, records a correspondence between the order and the device identity, and then receives an order obtaining request sent by a terminal device, where the order obtaining request is generated after the terminal device receives an order payment request sent by the cloud application instance, and the order obtaining request carries the device identity. The payment management node obtains the order from the correspondence based on the device identity carried in the order obtaining request, and sends the order to the terminal device, such that the terminal device can receive and process the order.

According to the method described in the fifth aspect, the cloud application instance sends a to-be-paid order of a user to a payment management node, and then a terminal device held by the user obtains the order from the payment management node, and pays the order using a payment application running on the terminal device. In this entire payment process, the cloud application instance does not receive any payment-related information of the user, for example, a payment account and a payment password of a payment platform. This can prevent the cloud application instance from recording a payment password, and ensure security of payment by the user using the cloud application instance.

In a possible implementation, the method further includes the following steps: The payment management node receives an identity of a payment platform, a payment account, and a payment password that are sent by the terminal device, where the identity of the payment platform is an identity of a payment platform selected by a user, and the payment account and the payment password are obtained by the terminal device from the user. The payment management node sends, to the payment platform based on the identity of the payment platform, the payment account, the payment password, and a payment collection account and a price of a selling object that are recorded in the order. When the payment platform successfully verifies the payment account based on the payment password, the payment management node receives first payment success information sent by the payment platform. Then, the payment management node sends second payment information to an application service node, such that the application service node can record, based on the second payment success information, that the order takes effect.

In the foregoing implementation, after the terminal device pays the order using the payment platform, the payment management node may send the second payment success information to the application service node after receiving the first payment success information sent by the payment platform, such that the application service node can record that the order takes effect. In this entire order payment and order effective process, the payment account and the payment password of the payment platform of the user do not need to be sent to the cloud application instance, thereby eliminating a possibility that the cloud application instance records the payment account and the payment password of the user, this resolves a problem that there is a security risk when a user pays an order using a cloud application instance.

According to a sixth aspect, a payment management node is provided. The payment management node includes a receiving module, a recording module, an obtaining module, and a sending module. The receiving module is configured to receive an order and a device identity that are sent by a cloud application instance. The recording module is configured to receive a correspondence between the order and the device identity. The receiving module is configured to receive an order obtaining request sent by a terminal device, where the order obtaining request is generated after the terminal device receives an order payment request sent by the cloud application instance, and the order obtaining request carries the device identity. The obtaining module is configured to obtain the order from the correspondence based on the device identity carried in the order obtaining request. The sending module is configured to send the order to the terminal device, such that the terminal device can receive and process the order.

Any one of the sixth aspect or the implementations of the sixth aspect is an apparatus implementation corresponding to any one of the fifth aspect or the implementations of the fifth aspect. The description in any one of the sixth aspect or the implementations of the sixth aspect is applicable to any one of the fifth aspect or the implementations of the fifth aspect. Details are not described herein.

According to a seventh aspect, a computer-readable storage medium is provided, including instructions. When the instructions are run on a computing device, the computing device performs the method described in the third aspect or the fifth aspect.

According to an eighth aspect, a computer program product is provided. When the computer program product is read and executed by a computing device, the method described in the third aspect or the fifth aspect is implemented.

According to a ninth aspect, a terminal device is provided, including a processor and a memory. When the processor executes code in the memory, a computing device implements the method described in the third aspect.

According to a tenth aspect, a computing device is provided, including a processor and a memory. When the processor executes code in the memory, the computing device implements the method described in the fifth aspect.

BRIEF DESCRIPTION OF DRAWINGS

FIG. 9A and FIG. 9B are a schematic flowchart of steps of a payment method based on a cloud application instance according to this application in an application scenario;

DESCRIPTION OF EMBODIMENTS

Figure 1A:
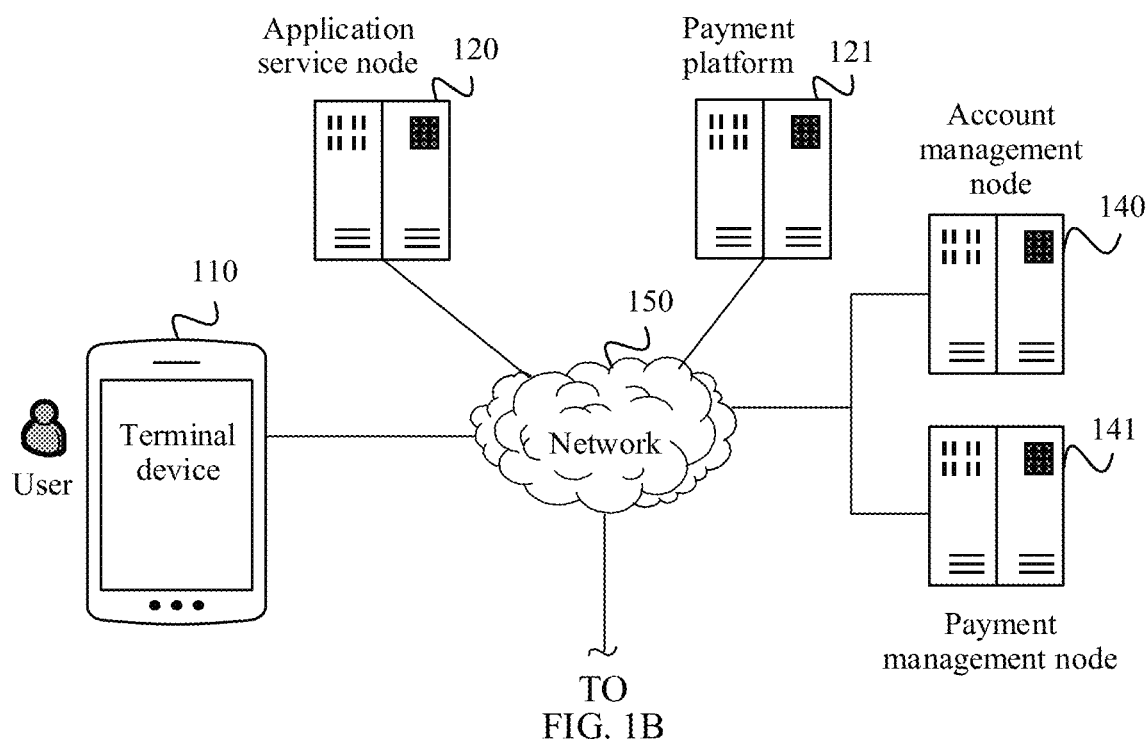
FIG. 1A and FIG. 1B are a schematic diagram of an architecture of a public cloud system.

The following describes technical solutions in embodiments of the present disclosure with reference to accompanying drawings in embodiments of the present disclosure. It is clear that the described embodiments are merely a part rather than all of embodiments of the present disclosure. All other embodiments obtained by a person of ordinary skill in the art based on embodiments of the present disclosure without creative efforts shall fall within the protection scope of the present disclosure.

For ease of understanding of embodiments of this application, some terms in this application are first explained and described.

Container: The container is a group of processes that are isolated from each other due to resource restrictions.

Cloud application instance: The could application instance is a container, a virtual machine, or a bare metal server that is virtualized on a physical server and has a mobile phone operating system and a virtual mobile phone function. In essence, applications on a mobile phone are transferred to a container, virtual machine, or bare metal server on a public cloud for running. Different cloud application instances are isolated from each other and do not interfere with each other. Local mobile phone applications can be installed on the cloud application instance and run on the cloud application instance. Audio and video streams generated during running can be sent to a local terminal device of a user for display and play, control commands generated by the local terminal device of the user based on the displayed and played audio and video streams may also be sent to the cloud application instance. The cloud application instance controls a running status of the application based on the control command, such that the application of the local mobile phone may be transferred to the cloud application instance for running. The local terminal device of the user does not need to install a large quantity of applications that consume hardware resources, such that the applications can be lightweight.

Public cloud: A core attribute of the public cloud is shared resource service, which means a cloud infrastructure and services provided by a third-party supplier for a user to use through a public network (such as the Internet). The user can obtain permission to use the cloud infrastructure and services by paying fees.

Software Development Kit (SDK): The SDK is a set of development tools used by developers to establish applications for specific software packages, software frameworks, hardware platforms, operating systems, and the like. Simply speaking, the SDK is a tool package that can implement a function of a software product. With the SDK, the developers do not need to develop each function of the product. Instead, the developers can integrate a required function into the product by directly selecting a required SDK based on the required function of the product.

Next, an application scenario in this application is briefly described.

With rapid development of cloud computing technologies and various network infrastructures, a traditional IT service architecture is gradually migrating to a public cloud, and more and more service applications are redesigned and used based on a public cloud architecture. In the public cloud architecture, user applications are installed in a cloud application instance. The cloud application instance can transmit audio and video images rendered during application operation to a terminal device 110 in a form of audio and video streams. The terminal device 110 only needs to display the received audio and video streams on a screen, such that the applications can be truly download-free, installation-free, and tap-to-use.

Figure 1B:
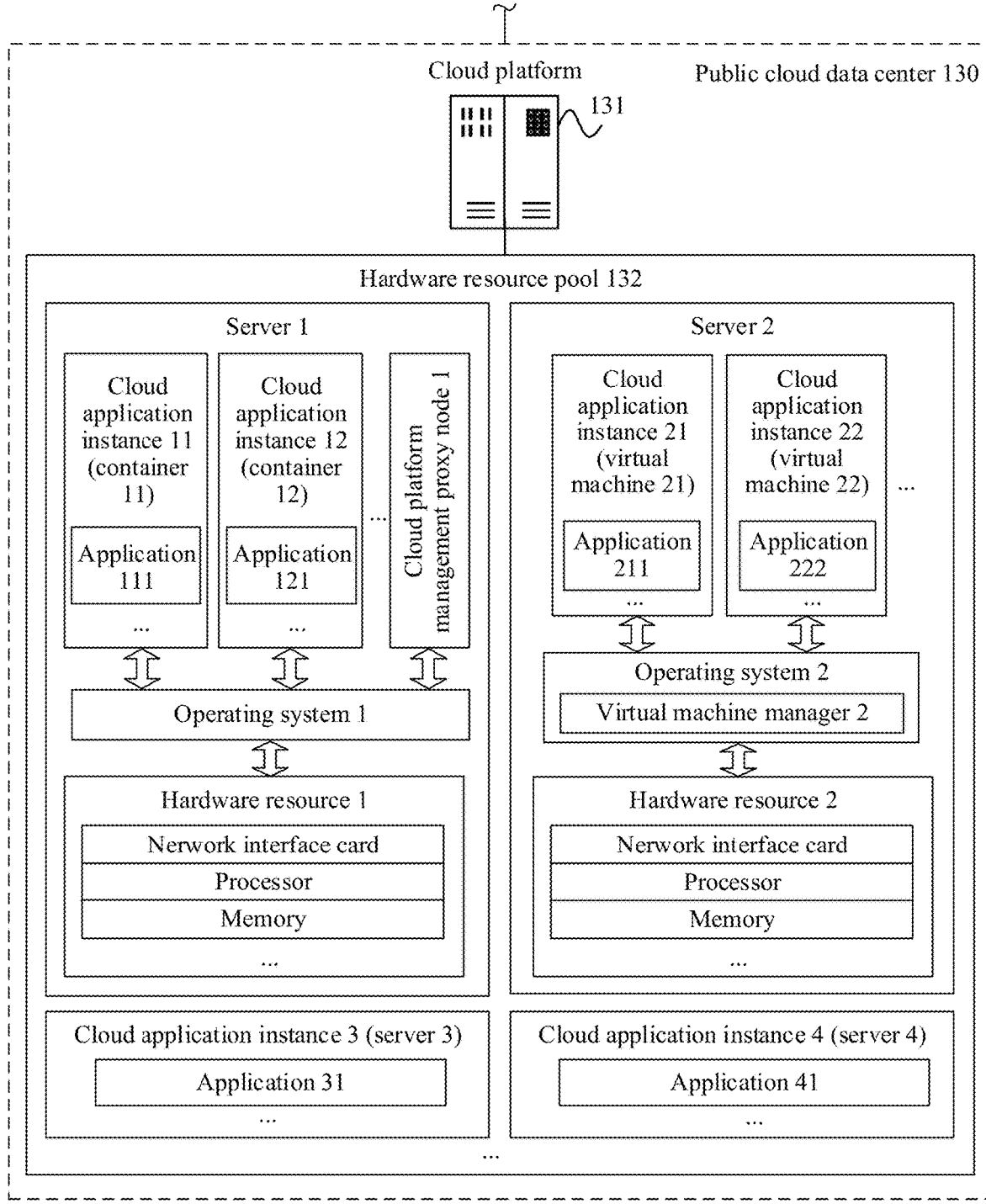

FIG. 1A and FIG. 1B are a schematic diagram of an architecture of a public cloud system. As shown in FIG. 1A and FIG. 1B, the system includes a terminal device 110, an application service node 120, an account management node 140, a payment management node 141, a payment platform 121, and a public cloud data center 130. In addition, the terminal device 110, the application service node 120, the account management node 140, and the public cloud data center 130 are connected using a network 150.

The terminal device 110 may be an electronic device having a streaming media playback capability, such as a smartphone, a palmtop processing device, a tablet computer, a mobile notebook computer, a virtual reality device, a wearable device, or an integrated palmtop. In FIG. 1A and FIG. 1B, an example in which the terminal device 110 is a smartphone is used for description. However, this is not specifically limited in this application. The terminal device 110 is held by a user.

The application service node 120, the payment platform 121, the account management node 140, and the payment management node 141 may be general-purpose physical servers, for example, ARM servers or X86 servers, or may be virtual machines (VM) implemented using a network functions virtualization (NFV) technology. The virtual machines are complete computer systems that are simulated using software and that have complete hardware system functions and run in an isolated environment. Alternatively, the server cluster may be a server cluster. Each server in the server cluster may be implemented by the foregoing physical server, or may be implemented by the foregoing virtual machine.

The application service node 120 is configured to provide various services for the user. The application service node 120 may include a game server, an education application server, a video application server, a social application server, a virtual reality application server, and the like. This is not specifically limited in this application.

The payment platform 121 is used to provide a third-party guaranteed payment service for the user. Simply speaking, a buyer sends a payment to a payment platform, and before the payment platform confirms shipment of a merchant, the payment platform temporarily keeps the payment on behalf of the buyer and the merchant. It should be noted that one payment platform 121 is used as an example for description in FIG. 1A and FIG. 1B. In specific implementation, there may be one or more payment platforms 121. This is not specifically limited in this application.

The account management node 140 is configured to process a related procedure in which a cloud application instance logs in to an application server node. The payment management node 141 is mainly configured to process a payment-related procedure of a cloud application instance.

The account management node 140 and the payment management node 141 may be communicatively connected using a network. In an embodiment, an account management node 140 and a payment management node 141 may alternatively be a same device, for example, a same virtual machine or a same physical machine.

The public cloud data center 130 includes a cloud platform 131 and a hardware resource pool 132. The cloud platform 131 may be implemented by a general-purpose physical server such as an ARM server or an X86 server, or may be a virtual machine implemented using an NFV technology. The virtual machine means a complete computer system that is simulated using software and that has a complete hardware system function and runs in an isolated environment. The cloud platform 131 may also be a virtual machine or a physical server in the hardware resource pool 132. This is not specifically limited in this application.

The hardware resource pool 132 may include at least one physical server (in FIG. 1A and FIG. 1B, an example in which the resource pool includes a server 1, a server 2, a server 3, and a server 4 is used for description). The physical server may be a general-purpose physical server such as an ARM server or an X86 server. This is not specifically limited in this application. There are internal network connections between the physical servers in the hardware resource pool 132 and the cloud platform, and each physical server may communicate with another physical server and the cloud platform 131 using an internal network.

Each physical server may run at least one cloud application instance. The cloud application instance may be any one of virtual machines (for example, a virtual machine 21 and a virtual machine 22), containers (for example, a container 11 and a container 22), and bare metal servers (BMS) (for example, a server 3 and a server 4) in FIG. 1B. The public cloud data center 130 may provide a cloud application instance leasing service for a user, and the terminal device 110 may rent cloud application instances of various specifications based on requirements of the terminal device 110, and install various applications in the cloud application instances. For example, assuming that a user needs to use an application 111, the user may send a purchase request to a cloud platform 131 to rent a cloud application instance, obtain permission to control the cloud application instance, and install an application in the cloud application instance. As shown in FIG. 1A and FIG. 1B, if the cloud application instance is implemented using a container, the cloud platform 131 may notify, based on a running environment needed for the application, a cloud platform management proxy node of a server to create a container, and install the application 111 in the cloud application instance. If the cloud application instance is implemented using a virtual machine, the cloud platform 131 may create the virtual machine based on a running environment needed for the application using a virtual machine manager, and install the application 111 in the cloud application instance. If the cloud application instance is a BMS, the cloud platform 131 may select a proper BMS based on a running environment needed for the application, and install the application 111 on the BMS, to obtain a cloud application instance in which the application 111 is installed. In this application, the cloud application instance is a virtual resource in a public cloud data center 130, and the virtual resource runs a mobile phone operating system. A specific form of the cloud application instance is not limited in this application.

After the terminal device 110 rents the cloud application instance (that is, the container 11) on which the application 111 runs, the terminal device 110 may remotely manipulate the application 111 on the cloud application instance. The cloud application instance may adjust hardware specifications based on a rent fee. A higher rent fee indicates higher hardware specifications. The cloud application instance may respond to a remote operation of a user, and send a subsequently generated audio and video stream to the terminal device 110 for display and play, such that the user can use an application program with a relatively high requirement on hardware resources using a terminal device 110 with relatively limited image processing and data computing capabilities, or even a terminal device 110 with only a streaming media playback capability.

It should be understood that, after the terminal device 110 stops remotely manipulating the application 111 on the cloud application instance, the cloud platform 131 may release the cloud application instance (that is, the container 11), and the released resource may be used by another user. When the terminal device 110 requests to remotely manipulate the application 111 on the cloud application instance again, the cloud platform 131 may create a cloud application instance in which the application 111 is installed for a user to use again.

In conclusion, in a public cloud architecture, user applications are installed in a cloud application instance. The cloud application instance can transmit audio and video images rendered during application operation to a terminal device in a form of audio and video streams. The terminal device only needs to display the received audio and video streams to a user, such that the applications can be truly download-free, installation-free, and tap-to-use.

However, when the user performs recharging in the application using the cloud application instance, for example, when the application is an online game application, the user needs to perform recharging in the online game application. Because the cloud application instance is disposed in a public cloud, if a terminal device transmits privacy information such as a payment account and a payment password of the user to the cloud application instance, such that the cloud application instance can pay an order using a third-party payment platform. When the user stops renting the cloud application instance, the privacy information such as a payment account and a payment password of the user may be recorded in the cloud application instance. If another user rents the cloud application instance, the financial information entered by the user last time is obtained, causing a security risk. Based on this, currently the user cannot perform any payment operation using the cloud application instance, causing inconvenience to the user.

To resolve the foregoing problem that there is a security risk when a user pays an order using a cloud application instance, this application provides a payment method based on a cloud application instance. The cloud application instance may first send an order to a payment management node 141, and then notify a terminal device 110 to obtain the order from an account management node 140. Then, the terminal device 110 pays the order using third-party payment software installed on the device. In this entire payment process, the cloud application instance does not receive privacy information such as a payment account and a payment password of the user, this greatly ensures security of payment using the cloud application instance.

It may be understood that, before performing payment using the cloud application instance, the user needs to first log in to an application server node 120 using the cloud application instance. Similarly, when an application in the cloud application instance needs to log in to the application service node 120, if the terminal device 110 transmits password information to the cloud application instance, to allow the cloud application instance to request login to the application service node 120, the password information may be recorded in the cloud application instance in this process. If another user rents the cloud application instance, password information entered by the user last time is obtained, causing a security risk.

Therefore, this application also provides a login method based on a cloud application instance, to resolve the foregoing problem that there is a security risk when a user logs in to an application server node using a cloud application instance. In this method, each time a user logs in to an application service node 120 using a cloud application instance, the cloud application instance notifies a terminal device 110. The terminal device 110 sends, to an account management node 140, a login password used to log in to a cloud platform account for verification. If the verification succeeds, the cloud application instance can log in to the application service node 120, and login password information does not need to be sent to the cloud application instance, thereby resolving the problem that there is a security risk when a user logs in to an application service node using a cloud application instance.

The following first describes the login method based on a cloud application instance provided in this application.

Figure 2:
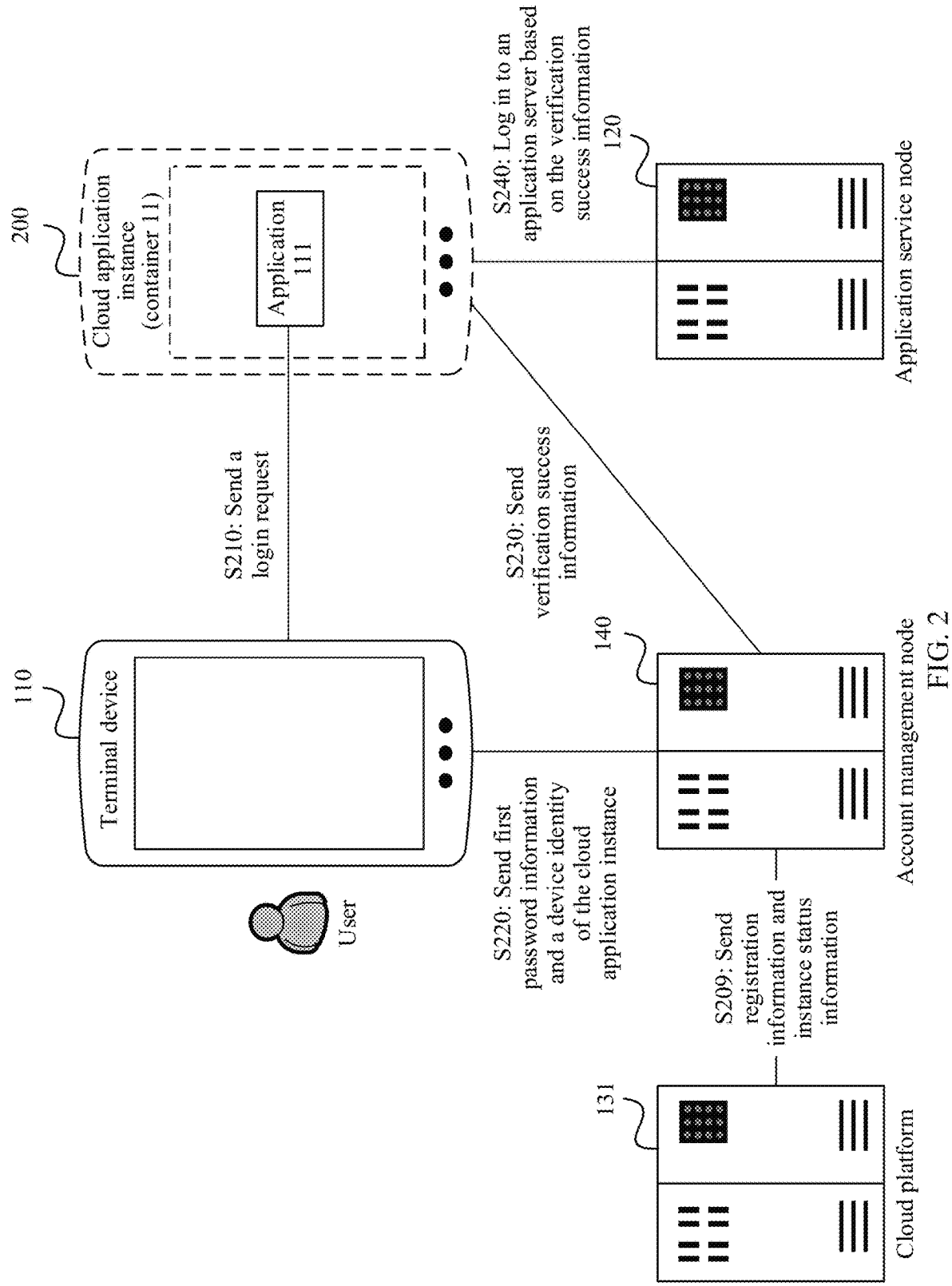
FIG. 2 is a schematic flowchart of steps of a login method based on a cloud application instance according to this application.

As shown in FIG. 2, the login method based on a cloud application instance provided in this application may include the following steps.

S209: A cloud platform 131 sends registration information and instance status information to an account management node 140, where the registration information includes an account and password correspondence between a cloud platform account and a registration password, the status information includes an identity and account correspondence between a device identity of a cloud application instance 200 and the cloud platform account, and the account management node 140 may record the correspondence. The registration information and the instance status information may be sent by the cloud platform 131 to the account management node 140. A user may register the cloud platform account on the cloud platform 131 and input the registration password. The cloud platform 131 records the correspondence between the cloud platform account and registration password information as the registration information. Moreover, the user may pay on the cloud platform using the cloud platform account, to rent the cloud application instance 200, and the cloud platform 131 records the correspondence between the cloud platform account and the device identity of the cloud application instance 200 as the instance status information.

In an embodiment, the user may alternatively send a registration request for the cloud platform account to the account management node 140, and the account management node 140 may record registration information in the registration request. The registration information includes the account and password correspondence between the cloud platform account and the registration password. This is not specifically limited in this application.

During specific implementation, the device identity is a unique character string, may be specifically a device feature code of the cloud application instance 200, and is a unique code used by the cloud platform to distinguish between cloud application instances 200. A specific form of the device identity is not limited in this application.

It should be noted that each time the user remotely uses the cloud application instance 200 using a terminal device 110, the cloud application instance 200 connected to the terminal device 110 each time may not be a same cloud application instance 200. Therefore, each time the terminal device 110 establishes a connection to the cloud application instance 200, the cloud platform may record instance status information of the cloud application instance 200 in real time, and then send the instance status information to the account management node 140.

S210: The cloud application instance 200 sends a login request for an application service node 120 to the terminal device 110.

The login request does not include user privacy information such as an account of the user. During specific implementation, the cloud application instance 200 may send the login request to the terminal device 110 using an event pipeline such as a Notify event pipeline. The event pipeline cannot transmit user privacy data, and can transmit only anonymized status information or action information. Sending the login request through the pipeline can avoid user privacy leakage and improve data transmission security.

S220: The terminal device 110 obtains, based on the login request, a login password entered by a user, and send a verification request that carries the login password and the device identity of the cloud application instance 200 to the account management node 140.

It should be noted that the login password is password information of the cloud platform account of the user. The login password may include biological information of the user, such as iris information, face information, fingerprint information, and voiceprint information, or may include password information of the user, such as a character password and an SMS verification code, or may be password information in another form. A specific form of the login password is not limited in this application.

During specific implementation, the device identity of the cloud application instance 200 may be a device identity obtained by the cloud application instance 200 before step S210 and after the terminal device 110 establishes a connection channel to the cloud application instance 200. The connection channel may be the event pipeline such as a Notify event pipeline in the foregoing content, or may be another connection channel between the cloud application instance 200 and the terminal device 110 that is used to transmit data. This is not specifically limited in this application.

It can be learned with reference to the foregoing content that, each time the user remotely uses a cloud application instance using the terminal device 110, the cloud application instance connected to the terminal device 110 may not be a same cloud application instance. Therefore, the device identity of the cloud application instance 200 changes. However, regardless of how the device identity of the cloud application instance changes, each time the terminal device 110 establishes a connection to the cloud application instance 200, the device identity of the cloud application instance 200 currently connected to the terminal device 110 may be obtained through the connection channel. For example, when a terminal device 110 requests to run an application 111 using a cloud application instance for the first time, a cloud platform 131 creates a container 11, and establishes a connection channel 1 between the container 11 and the terminal device 110. The terminal device 110 may obtain a device identity of the container 11 through the connection channel 1. After the terminal device 110 disconnects from the container 1, the cloud platform 131 may release the container 1, and the released resource may be provided for another user to use. When a user requests to run the application 111 using a cloud application instance for the second time, the cloud platform 131 may re-create a container 12, and establish a connection channel 2 between the container 12 and the terminal device 110. The terminal device 110 may obtain a device identity of the container 12 through the connection channel 2. It should be understood that the foregoing example is merely used for description, and does not constitute a specific limitation.

S230: The account management node 140 verifies the login password, and when the verification succeeds, generates verification success information and sends the verification success information to the cloud application instance 200 based on the device identity. The verification success information may be a token, and may be specifically a unique character string generated based on a device identity of a cloud application instance. This is not specifically limited in this application.

In an embodiment, before step S210, when the user sends the registration request for the cloud platform account, the account management node 140 may record the registration information in the registration request. The registration information includes the account and password correspondence between the cloud platform account and the registration password. Moreover, each time after the terminal device 110 establishes a connection to the cloud application instance 200, the cloud platform may further send the status information of the cloud application instance 200 to the account management node 140. The status information includes the identity and account correspondence between the device identity of the cloud application instance 200 and the cloud platform account, and the account management node 140 may record the identity and account correspondence. In this way, in step S230, after receiving the login password sent by the user and the device identity, the account management node 140 may first determine, based on the device identity and the stored identity and account correspondence, the cloud platform account corresponding to the device identity, and then obtain, based on the account and password correspondence and the cloud platform account, the registration password entered during user registration. In this way, in step S230, the account management node 140 may compare the login password with the registration password, and when the login password is consistent with the registration password, confirm that the verification succeeds and generate the verification success information. If the login password is inconsistent with the registration password, the account management node 140 may return password error information to the terminal device 110, and the user may re-enter a password for re-verification. It may be understood that although the terminal device 110 sends the login password to the account management node 140, the terminal device 110 does not send the cloud platform account, and the account management node 140 obtains, based on the device identity, the cloud platform account corresponding to the login password. In this way, even if the login password is learned by another person, the cloud platform account corresponding to the password information cannot be learned. Therefore, a transmission process is very secure, and privacy data of the user is strongly ensured.

The cloud application instance 200 may poll the terminal device 110 through an event channel, to query whether the terminal device 110 has sent the login password and the device identity to the account management node 140. When it is confirmed that the terminal device 110 has sent the login password and the device identity to the account management node 140, the cloud application instance 200 sends a verification result obtaining request to the account management node 140, where the verification result obtaining request includes the device identity of the cloud application instance 200, the account management node 140 returns verification success information of the cloud platform account to the cloud application instance 200 based on the device identity carried in the verification result obtaining request.

It may be understood that the terminal device 110 sends the login password and the device identity to the account management node 140 for verification, and the cloud application instance 200 directly obtains the verification success information using the device identity. This prevents the cloud application instance 200 from recording the login password, thereby improving data transmission security.

S240: The cloud application instance 200 logs in to the application service node 120 based on the verification success information.

During specific implementation, the cloud application instance 200 may send the verification success information to the application service node 120. The application service node 120 sends a check request to the account management node 140 based on the verification success information. The check request carries the verification success information. When determining that the account management node 140 records the verification success information, the account management node 140 may return check success information to the application service node 120, such that the application service node 120 allows the cloud application instance 200 to log in to the application service node 120. Otherwise, the account management node 140 returns check failure information, and the application service node 120 does not allow the cloud application instance 200 to log in to the application service node 120.

In an embodiment, the account management node 140 records correspondence between the verification success information and the cloud platform account. After receiving the check request that carries the verification success information and that is sent by the application service node 120, when determining that the account management node 140 records the verification success information carried in the check request, which indicates login verification succeeds, the account management node 140 may further determine whether the cloud platform account corresponding to the verification success information is bound to an application account. If the cloud platform account is bound to an application account, the account management node 140 can return the application account bound to the cloud platform account to the application service node 120. The application service node 120 may obtain various application data such as a game archive, a historical playback record, and favorites content of the user from the application service node 120 based on the application account, and then allow the cloud application instance 200 to log in to the application service node 120 using the application account. If the account management node 140 determines that the cloud platform account is not bound to an application account, the account management node 140 may send an application account creation request to the application service node 120. The application service node 120 may create an application account based on the application account creation request, and allow the cloud application instance 200 to log in to the application service node 120 using the newly created application account. The application service node 120 may further return the newly created application account to the account management node 140, such that the account management node 140 may store a binding relationship between the cloud platform account of the user and the newly created application account in a database. After the cloud platform account of the user is bound to the application account, each time the user logs in to the application service node 120 using the cloud application instance 200, the user only needs to send, to the account management node 140 using the terminal device 110, the login password corresponding to the cloud platform account for verification. If the verification of the cloud platform account succeeds, the user can log in to the application service node 120 without recording the application account.

It should be noted that, in this embodiment of this application, although the account management node 140 is configured to verify the cloud platform account, because the cloud platform account is in a binding relationship with the application account, the account management node 140 may be operated and maintained by a service provider of the application service node 120.

In conclusion, in the login method based on a cloud application instance 200 provided in this application, the cloud platform account of the user is bound to the application account. Each time the user logs in to the application service node 120 using the cloud application instance 200, the cloud application instance 200 notifies the terminal device 110. The terminal device 110 sends, to the account management node 140, the login password used to log in to the cloud platform account for verification. If the verification succeeds, the cloud application instance 200 can log in to the application service node 120, and login password information does not need to be sent to the cloud application instance 200, thereby resolving the problem that there is a security risk when a user logs in to an application service using a cloud application instance 200.

The following describes the login method provided in this application using an application scenario in which an application is a cloud game, a terminal device 110 is a smartphone, and a cloud application instance 200 is a container as an example.

Figure 3A:
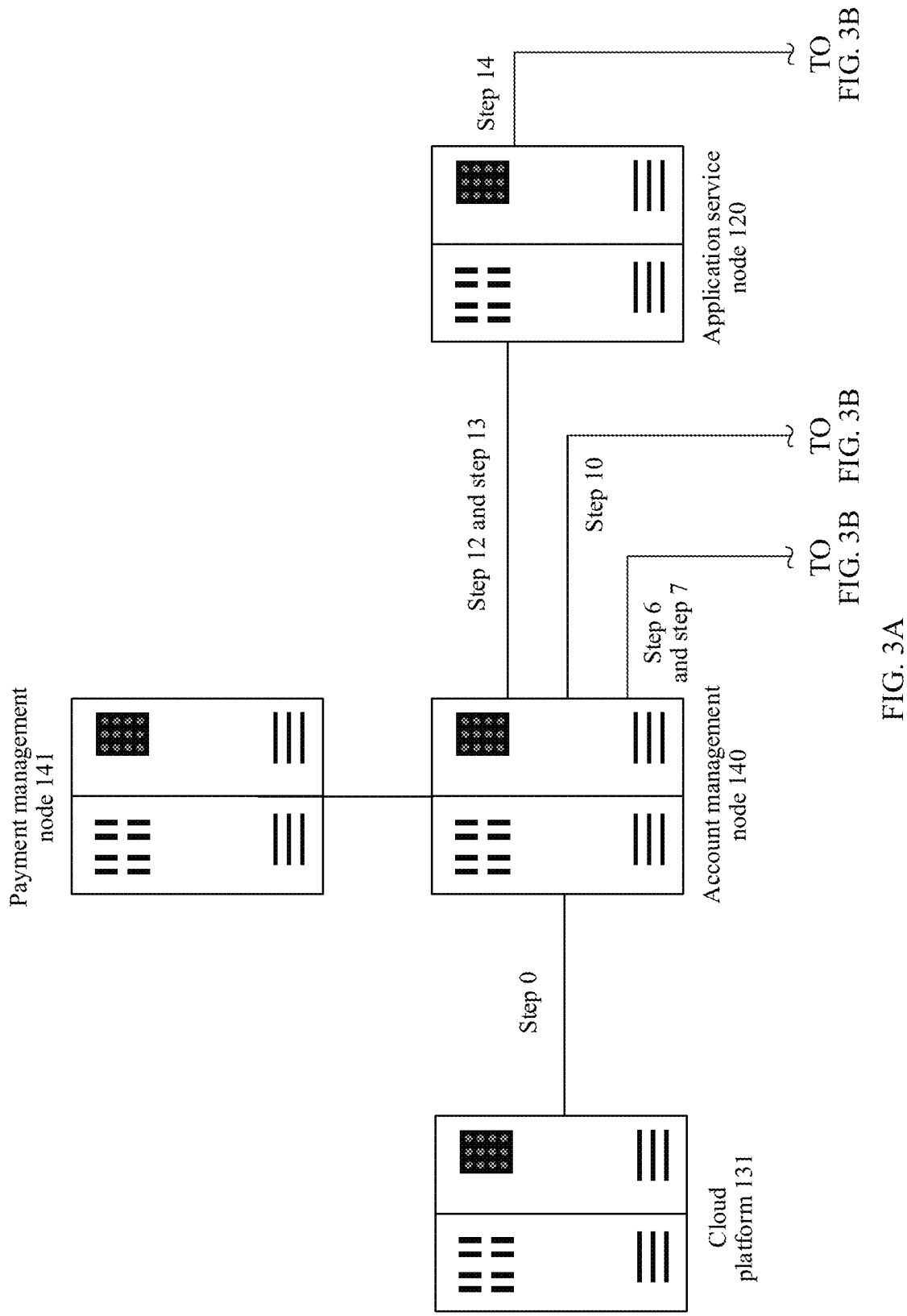
FIG. 3A and FIG. 3B are a schematic flowchart of steps of a login method based on a cloud application instance according to this application in an application scenario.
Figure 3B:
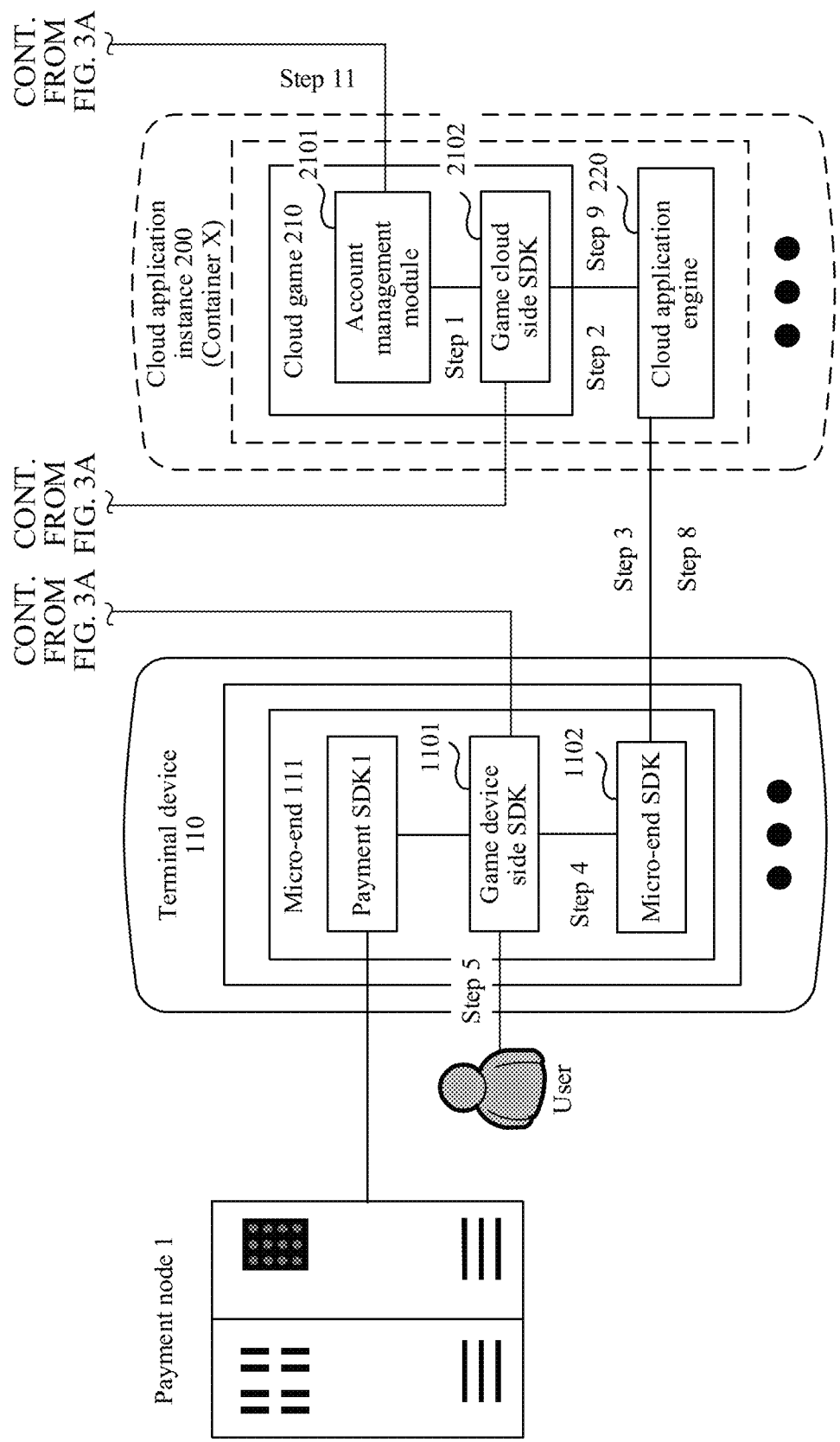

First, refer to FIG. 3A and FIG. 3B. FIG. 3A and FIG. 3B are a schematic flowchart of steps of a login method based on a cloud application instance 200 provided in this application in an application scenario.

In this application scenario, the terminal device 110 is a smartphone on which a micro-end 111 is installed, where the micro-end 111 means a micro-client or a thin client. The micro-end 111 focuses on processing data display of a user interface (UI), and is responsible for sending an operation action of a user to a cloud application instance 200 connected to the micro-end 111 for processing, and then receiving an audio and video stream sent by the cloud application instance 200 and displaying the audio and video stream to the user. Therefore, memory occupation of the micro-end 111 is small, an installation package is also small, such that the user can quickly download the micro-end 111. The micro-end 111 includes a game device side SDK 1101 and a micro-end SDK 1102. The game device side SDK 1101 is mainly configured to process interaction between the terminal device 110 and an account management node 140, for example, send an obtained login password to the account management node 140 for verification. The micro-end SDK is mainly configured to process interaction between the terminal device 110 and the cloud application instance 200, for example, receive a login request sent by the cloud application instance 200 for the application service node 120.

The cloud application instance 200 includes a cloud game 210 and a cloud application engine 220, where the cloud game 210 includes an account management module 2101 and a game cloud side SDK 2102. The account management module 2101 is mainly configured to process information related to account login, for example, send verification success information to the application service node 120 to request login. The game cloud side SDK 2102 is mainly configured to process interaction with the account management node 140, for example, obtain verification success information from the account management node 140. The cloud application engine is configured to process interaction between the cloud application instance 200 and the terminal device 110, for example, send a login request for the application service node 120 to the terminal device 110.

It should be noted that the cloud application engine 220 in the cloud application instance 200 is generated when a cloud platform 131 creates the cloud application instance 200, the account management module 2101 and the game cloud side SDK 2102 may be integrated into the cloud game 210, and the game device side SDK 1101 and the micro-end SDK 1102 may also be integrated into the micro-end 111. Simply speaking, after a third-party game vendor provides the micro-end 111 and the cloud application instance 200, the game device side SDK 1101 and the micro-end SDK 1102 are integrated into the micro-end 111, and the account management module 2101 and the game cloud side SDK 2102 are integrated into the cloud game 210, such that the login method based on a cloud application instance provided in this application can be implemented.

In this application scenario, the application service node 120 is a service software system constituted based on a plurality of modules such as a cloud server module, an application and game instance rendering module, an audio and video encoding and decoding module, a network transmission module, a resource management and scheduling system module, and a terminal access module.

It should be noted that the unit modules of the cloud game login system shown in FIG. 3A and FIG. 3B may be divided into a plurality of types. The modules may be software modules, or may be hardware modules, or may be partially software modules and partially hardware modules. FIG. 3A and FIG. 3B are only an example division manner, and this is not limited in this application.

In the application scenario shown in FIG. 3A and FIG. 3B, the login method based on a cloud application instance provided in this application may include the following steps.

Step 0: The account management node 140 receives registration information and instance status information sent by the cloud platform 131, where the registration information includes an account and password correspondence between a cloud platform account and a registration password, the status information includes an identity and account correspondence between a device identity of the cloud application instance 200 and the cloud platform account, and the account management node 140 may record the identity and account correspondence. The user may register the cloud platform account on the cloud platform 131 and enter the registration password. The cloud platform 131 records the correspondence between the cloud platform account and the registration password information as the registration information. In addition, the user may pay on the cloud platform using the cloud platform account, to rent the cloud application instance 200, the cloud platform 131 records the correspondence between the cloud platform account and the device identity of the cloud application instance 200 as the instance status information, and the cloud platform 131 sends the instance status information and the registration information to the account management node 140. For content that is not described in step 0, refer to step S209 in the foregoing content. Details are not described herein again.

Step 1: The account management module 2101 of the cloud game 210 sends a login request to the game cloud side SDK 2102. The login request may be generated in a process in which the terminal device 110 remotely manipulates the cloud application instance 200, and the login request is a login request for the application service node 120.

It should be understood that, before step 1, the terminal device 110 has established a connection channel to the cloud application instance 200. There may be one or more connection channels. Some connection channels may be used by the terminal device 110 to remotely manipulate the cloud application instance 200 to experience the cloud game, some connection channels may be used by the micro-end SDK 1102 to obtain the device identity of the cloud application instance 200, and some connection channels may be used by the account management module 2101 of the cloud game 210 to send the login request to the game cloud side SDK 2102.

Step 2: The game cloud side SDK 2102 sends the login request to the cloud application engine 220.

Step 3: The cloud application engine 220 sends the login request for the application service node 120 to the micro-end SDK 1102. For content that is not described in step 1 to step 3, refer to step S210 in the foregoing content. Details are not described herein again.

It should be understood that the cloud application engine 220 sends the login request to the micro-end SDK 1102 using the previously established connection channel. The connection channel is an event channel such as a Notify event channel that can transmit only anonymized information such as event information and status information. In an entire login procedure, the terminal device 110 interacts with the cloud application instance 200 only through the event channel, and all interaction information is anonymized information, thereby avoiding a user privacy leakage problem.

Step 4: The micro-end SDK 1102 sends the login request for the application service node 120 to the game device side SDK 1101.

Step 5: The game device side SDK 1101 obtains a login password entered by the user, for example, collects a fingerprint of the user, or collects a face image of the user. This is not specifically limited in this application. The login password is password information corresponding to the cloud platform account.

Step 6: The game device side SDK 1101 sends a verification request carrying the login password and the device identity of the cloud application instance 200 to the account management node 140. For content that is not described in step 4 to step 6, refer to step S220 in the foregoing content. Details are not described herein again.

Step 7: The account management node 140 may verify the login password, and when the verification succeeds, generate verification success information.

It may be understood that the account management node 140 records the registration information and the instance status information, where the registration information includes the account and password correspondence between the cloud platform account and the registration password, the status information includes the identity and account correspondence between the device identity of the cloud application instance 200 and the cloud platform account, and the account management node 140 may record the identity and account correspondence. Therefore, in step 7, after receiving the login password sent by the user and the device identity, the account management node 140 may first determine, based on the device identity and the stored identity and account correspondence, the cloud platform account corresponding to the device identity, and then obtain, based on the account and password correspondence and the cloud platform account, the registration password entered during user registration. The account management node 140 may compare the login password with the registration password, and when the login password is consistent with the registration password, confirm that the verification succeeds and generate the verification success information. It may be understood that, although the terminal device 110 sends the login password to the account management node 140, the terminal device 110 does not send the cloud platform account, and the account management node 140 obtains, based on the device identity, the cloud platform account corresponding to the login password. In this way, even if the login password is learned by another person, the cloud platform account corresponding to the password information cannot be learned. Therefore, a transmission process is very secure, and privacy data of the user is strongly ensured.

Step 8: The cloud application engine 220 sends a confirmation request to the micro-end SDK 1102 of the terminal device 110, to confirm whether the game device side SDK 1101 performs step 6, that is, whether the game device side SDK 1101 has sent the verification request to the account management node 140.

During specific implementation, the cloud application engine 220 may poll the micro-end SDK 1102 through the event channel, to query whether the game device side SDK 1101 has sent the login password and the device identity to the account management node 140. The micro-end SDK 1102 confirms an execution status of step 6 to the device side SDK, and then returns the execution status to the cloud application engine through the event channel, where the event channel may be a Notify event channel.

In an embodiment, the game device side SDK 1101 may alternatively notify the micro-end SDK 1102 after sending the verification request to the account management node 140, and the micro-end SDK 1102 may send, to the cloud application engine 220 through an event channel, a notification indicating that step 6 has been completed. A specific procedure of how the cloud application engine determines whether the terminal device 110 sends the verification request to the account management node 140 is not limited in this application.

Step 9: When confirming, to the micro-end SDK 1102, that the game device side SDK 1101 has performed step 6, the cloud application engine 220 sends a notification to the game cloud side SDK 2102, such that the game cloud side SDK 2102 sends a verification success information obtaining request to the account management node 140.

It may be understood that, after the cloud application engine 220 sends the confirmation request to the micro-end SDK 1102, if a returned result shows that the game device side SDK 1101 has not performed step 6, the cloud application engine 220 may send the confirmation request to the device side SDK 1102 again, that is, step 8 is repeated, until it is confirmed that the game device side SDK 1101 has performed step 6, step 9 is performed.

Step 10: The game cloud side SDK 2102 obtains the verification success information from the account management node 140, where the verification success information may be a Token.

Specifically, the game cloud side SDK 2102 may send the verification success information obtaining request carrying the device identity to the account management node 140. It may be understood that, in step 6, when the game device side SDK 1101 sends the verification request carrying the login password to the account management node 140, the device identity of the cloud application instance 200 is also carried as a pairing basis. Therefore, in step 10, the account management node 140 may determine, based on the device identity in the obtaining request sent by the game cloud side SDK 2102, the login password carrying the same device identity, and then return verification success information generated using the login password to the game cloud side SDK 2102 of the cloud application instance 200.

It may be understood that, for content that is not described in step 7 to step 10, refer to step S230 in the foregoing embodiment. Details are not described herein again.

Step 11: The game cloud side SDK 2102 sends the verification success information to the account management module 2101, and the account management module 2101 sends the verification success information to the application service node 120 to request login.

Step 12: The application service node 120 sends a check request carrying the verification success information to the account management node 140, to request the account management node 140 to check the verification success information. When determining that the verification success information exists locally, the account management node 140 may further determine whether a cloud platform account corresponding to the verification success information is bound to an application account. Because the embodiment in FIG. 3A and FIG. 3B is described using an example in which the user has never registered an application account, the application service node 120 determines that the cloud platform account is not bound to an application account, and the account management node 140 generates check success information and an application account creation request.

Step 13: The account management node 140 returns the check success information and the application account creation request to the application service node 120.

Step 14: The application service node 120 creates a new account based on the application account creation request, and allows the cloud application instance 200 to log in to the application service node 120 using the newly created application account.

During specific implementation, the application service node 120 may randomly create an application account based on the application account creation request. The application service node 120 may further create a new game archive, bind the game archive to the newly created application account, and return the newly created application account to the account management node 140, such that the account management node 140 may bind the newly created application account to the cloud platform account, and store the binding relationship in a database maintained by the account management node 140.

In this way, when the user logs in to the application service node 120 using the cloud application instance 200 again, the cloud application instance 200 may perform step 1 to step 3 to send the login request to the terminal device 110. The terminal device 110 performs step 4 to step 6 to send the login password and the device identity to the account management node 140. The account management node 140 performs step 7 to perform verification on the login password to generate the verification success information. When the cloud application instance 200 performs step 8 to step 11 to obtain the verification success information from the account management node 140, and send the verification success information to the application service node 120 to request login, the application service node 120 may perform step 12 to send the check request of the verification success information to the account management node 140. After successfully checking the verification information, the account management node 140 may further confirm that the cloud platform account is bound to an application account, and then return the application account bound to the cloud platform account and check success information to the application service node 120, such that the application service node 120 can read game information such as a game archive and a user button location of the application account, and allow the cloud application instance 200 to log in to the application service node 120 again using the application account, and the user can log in to the application service node 120 without recording the application account.

It may be understood that, in the login method based on a cloud application instance 200 provided in this application, and in the application scenario shown in FIG. 3A and FIG. 3B, each time the user logs in to the application service node 120 using the cloud application instance 200, the cloud application instance 200 notifies the terminal device 110. The terminal device 110 sends, to the account management node 140, the login password used to log in to the cloud platform account for verification. If the verification succeeds, the cloud application instance 200 can log in to the application service node 120, and login password information does not need to be sent to the cloud application instance 200, thereby resolving the problem that there is a security risk when a user logs in to an application service using a cloud application instance 200.

For ease of understanding beneficial effects of the login solution based on a cloud application instance provided in embodiments of this application, for example, an application scenario in which the application described in FIG. 3A and FIG. 3B is a cloud game, the terminal device 110 is a smartphone, and the cloud application instance 200 is a container is used as an example to describe some example graphical user interfaces on which the user operates the terminal device 110 to remotely invoke the cloud application instance 200 to log in to the application service node 120 during step 0 to step 14.

It is assumed that the user taps a cloud platform application on the terminal device 110 to enter a home screen 11 of the cloud platform application. Herein, the cloud platform application is connected to the public cloud data center 130 in the foregoing content. The user may purchase various cloud application instances 200 using the cloud platform application, and transfer local mobile phone applications to the cloud application instance 200 for running. The local terminal device 110 of the user does not need to install a large quantity of applications that consume hardware resources, such that the application can be lightweight.

Figure 4:
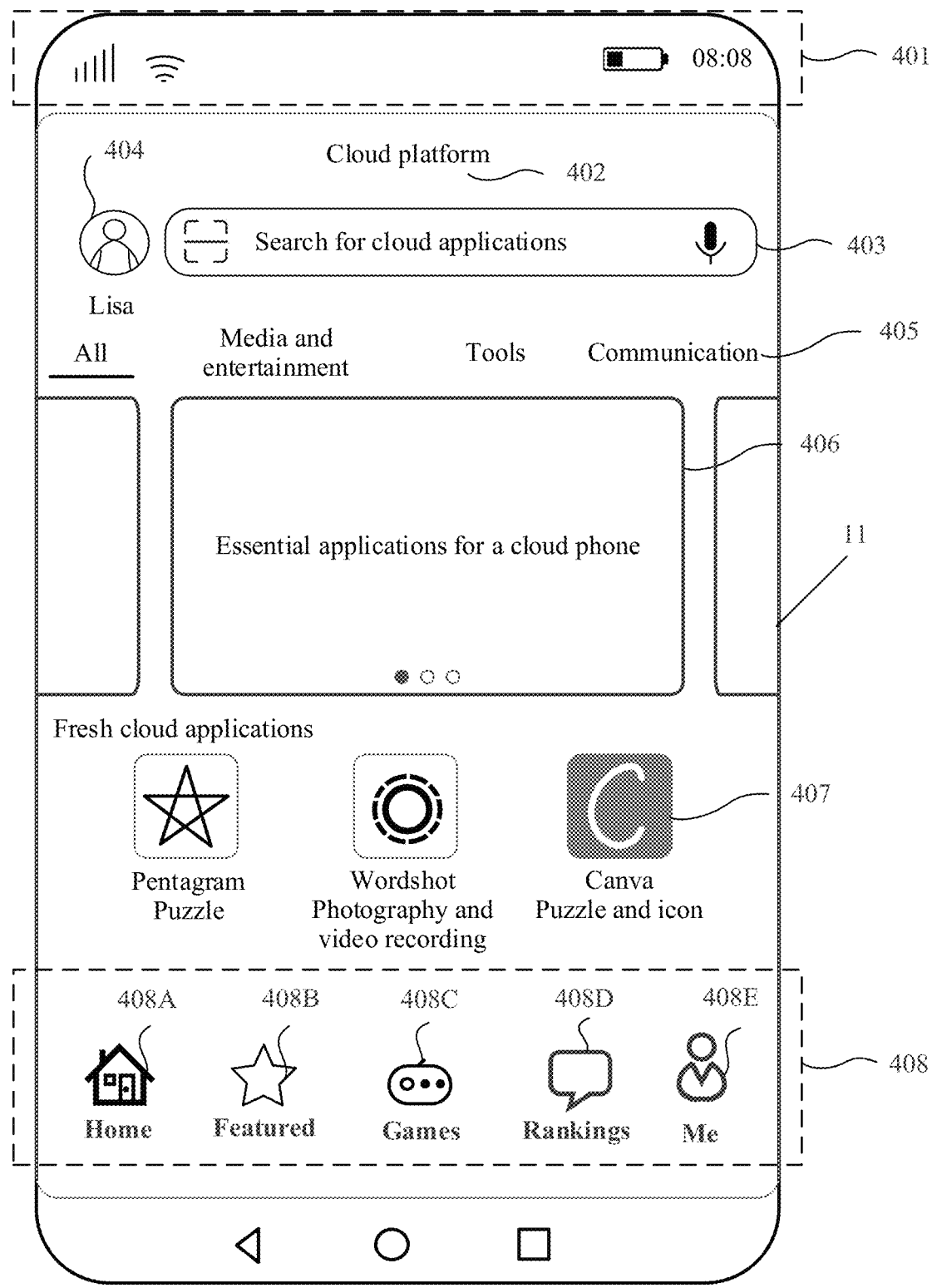
FIG. 4 to FIG. 7 are schematic diagrams of embodiments of some user interfaces in a login method based on a cloud application instance according to this application.

FIG. 4 shows an example of a user home screen 11 of a cloud platform of a terminal device 110. The user interface 11 may include: a status bar 401, an application title bar 402, a search box 403, a control 404, a function bar 405, a plurality of recommendation display boxes 406, a plurality of fresh controls 407, and a tray 408 of commonly used controls.

The status bar 401 may include one or more signal strength indicators of a mobile communications signal (which may also be referred to as a cellular signal), one or more signal strength indicators of a wireless fidelity (Wi-Fi) signal, a battery status indicator, and a time indicator.

The application title bar 402 may be used to indicate that a current page is used to display an interface of the cloud platform of the terminal device 110. A representation form of the application title bar 402 may be text information, an icon, or another form.

The search box 403 may be used to search, based on a character input by a user, for a setting option that matches the character.

The control 404 may receive a user operation (for example, a touch operation). In response to the detected user operation, the terminal device 110 may display an interface for logging in to a cloud platform account or an interface for switching a cloud platform account.

The function bar 405 includes a plurality of controls, such as a media entertainment control, a tools control, and a communication control. Each control can be used to receive a user operation (for example, a touch operation). In response to the detected user operation, the terminal device 110 may display a corresponding page, for example, display a media entertainment interface, a tools interface, and a communication interface.

The plurality of recommendation display boxes 406 are used to display covers of cloud applications recommended for download.

The plurality of fresh controls 407 are configured to display controls of a plurality of newly released cloud applications. Each control may be used to receive a user operation (for example, a touch operation). In response to the detected user operation, the terminal device 110 may display a page of a corresponding cloud application.

The tray 408 of common controls may display: a Home control icon 408A, a Featured control icon 408B, a Games control icon 408C, a Rankings control icon 408D, and a Me control icon 408E. All the foregoing control icons may accept a user operation (for example, a touch operation). In response to the detected user operation, the terminal device 110 may display a corresponding page. Specifically, the Home control icon 408A may be used to display a home page of the cloud platform, the Featured control icon 408B may be used to display a page recommended to the user, the Games control icon 408C may be used to display a page of a game application, and the Rankings control icon 408D may be used to display a page of application download or rating ranking, and the Me control icon 408E may be used to display an account center page.

It may be understood that FIG. 4 merely shows an example of an interface of the cloud platform application of the terminal device 110, and should not constitute a limitation on this embodiment of this application.

For example, as shown in FIG. 4, after the user taps a control icon of a cloud application "cloud game" in the plurality of fresh controls 307, the terminal device 110 detects the user operation. In response to the user operation, the terminal device 110 may display an interface 12 of the cloud application "cloud game" shown in FIG. 5A and FIG. 5B.

The user interface 12 may include: an account control 501, a return control 502, a cloud application title bar 503, a start control 504, and a plurality of cloud application introduction display boxes 505. The account control 501 may receive a user operation (for example, a touch operation). In response to the detected user operation, the terminal device 110 may display an interface for logging in to a cloud platform account.

The return control 502 may receive a user operation (for example, a touch operation). In response to the detected user operation, the terminal device 110 may exit the user interface 12 of the My account, and display a previous user interface of the user interface 12, for example, a user interface 11.

The cloud application title bar 503 is used to indicate that the current page is used to display a startup and an introduction interface of the "cloud game". The cloud application title bar 503 may include classification information, an application name, and the like of the cloud application displayed on the current page. A representation form of the cloud application title bar 503 may include text information, an icon, or another form.

The start control 504 may receive a user operation (for example, a touch operation). In response to the detected user operation, the terminal device 110 may start the cloud application "cloud game".

The plurality of cloud application introduction display boxes 505 are used for game content introduction of the cloud application "cloud game".

Figure 5A:
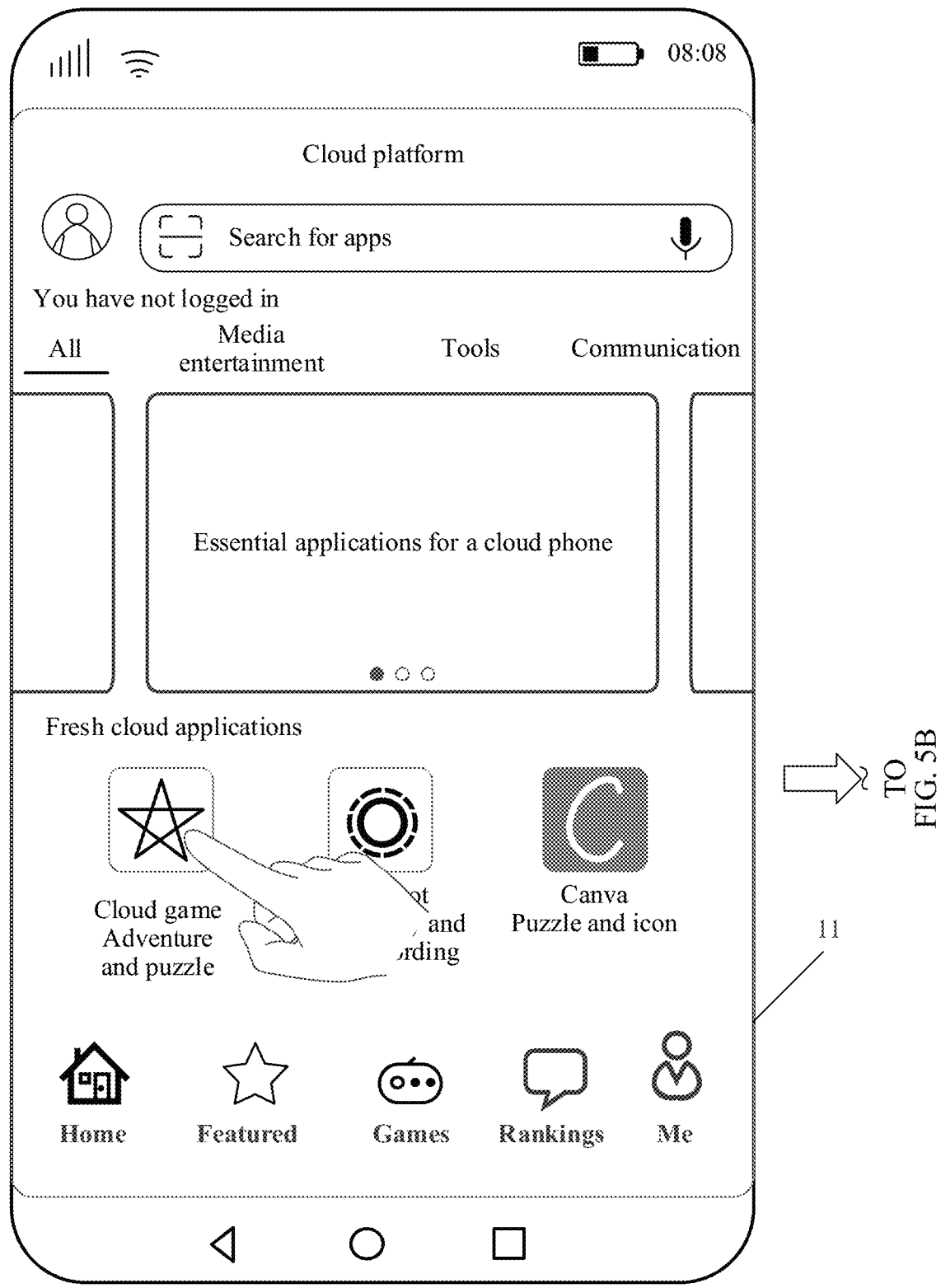
Figure 5B:
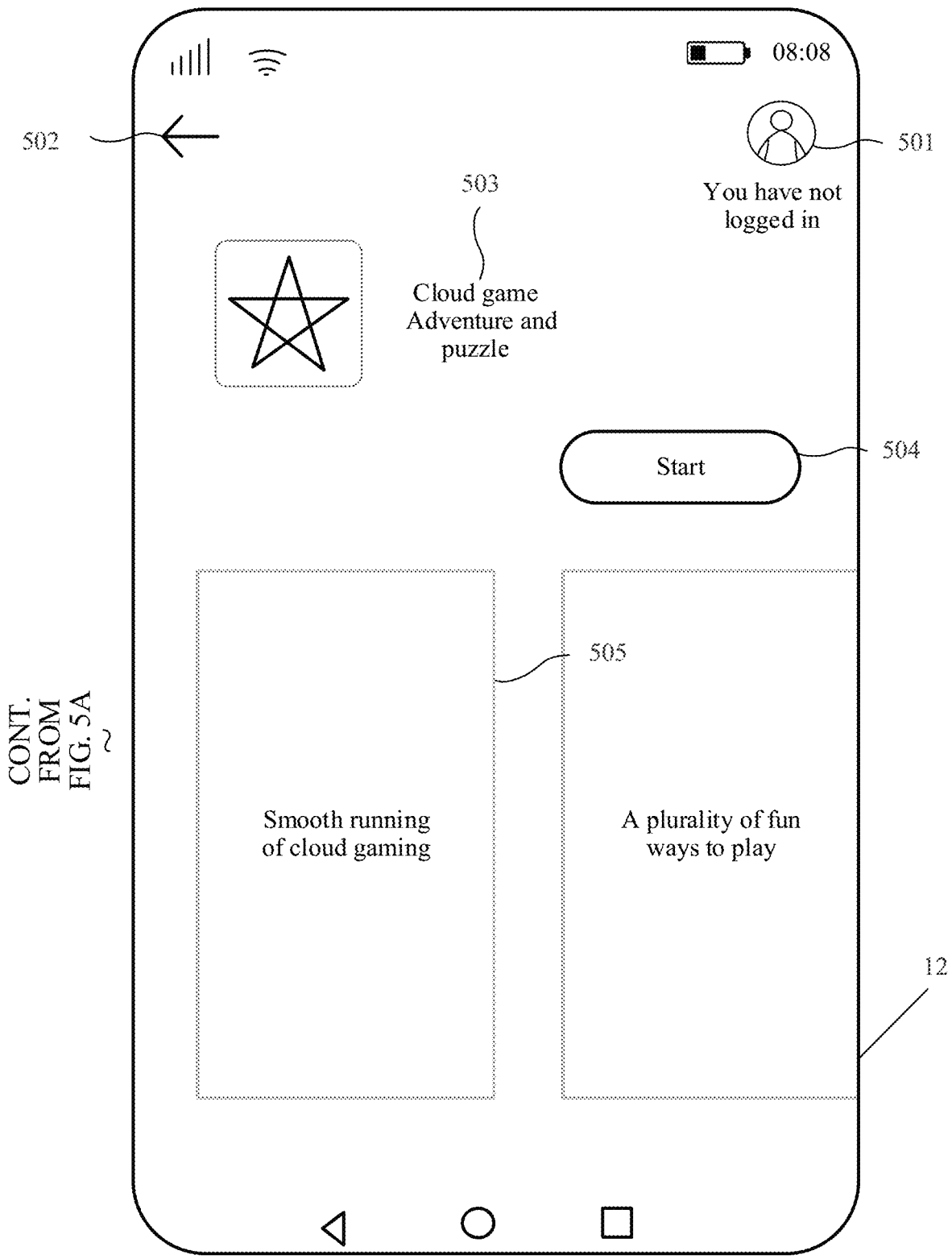

It may be understood that FIG. 5A and FIG. 5B merely show an example of the user interface 12 of the cloud application "cloud game" of the terminal device 110, and should not constitute a limitation on this embodiment of this application.

Figure 6:
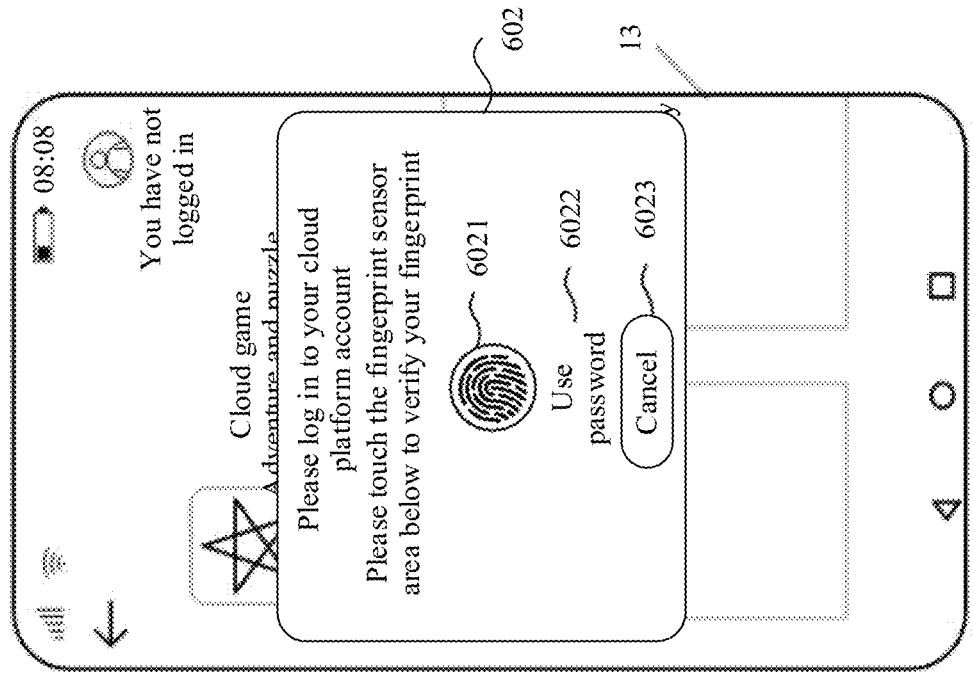
Figure 6:
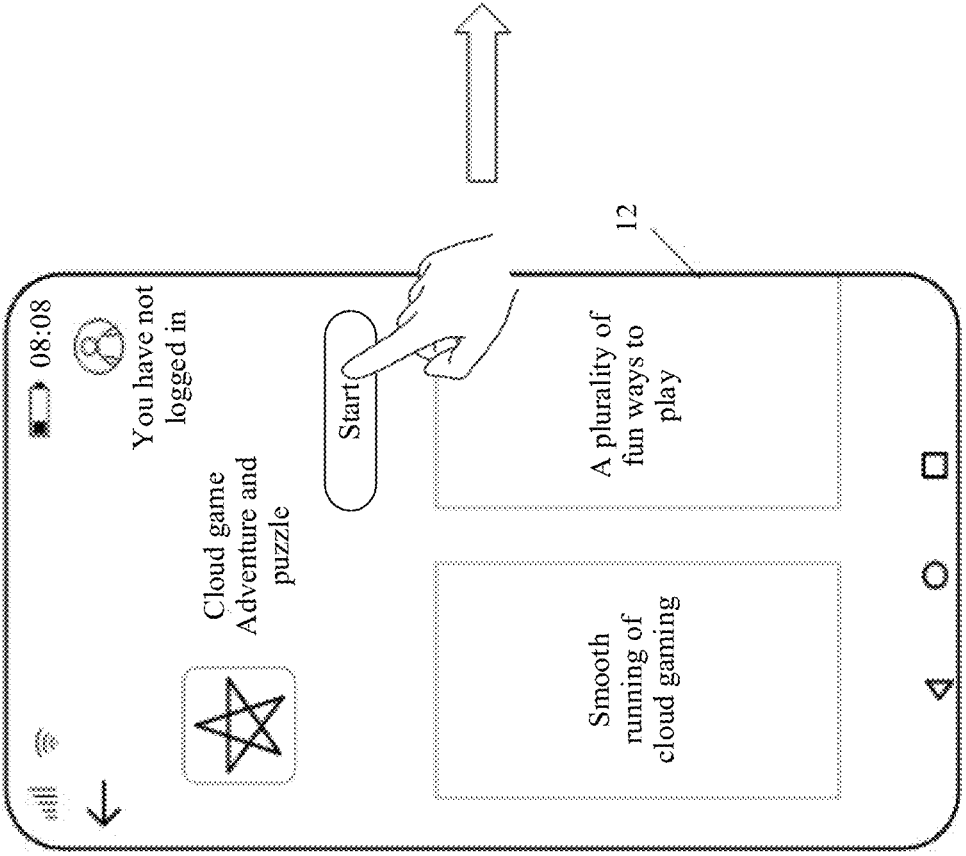

For example, as shown in FIG. 6, the user may tap the start control 504. The terminal device 110 detects the user operation, and sends a connection request to a cloud platform 131 in response to the user operation. The cloud platform 131 may create, based on a running environment of the "cloud game", a cloud application instance 200 on which the application "cloud game" is installed, and then establish a connection channel between the cloud application instance 200 and the terminal device 110. The terminal device 110 may obtain a device identity of the cloud application instance 200 from the connection channel.

Then, the cloud application instance 200 may generate a login request, and send the login request to the terminal device 110 through a previously created connection channel (for example, a Notify event channel) (step S210). The terminal device 110 may obtain a login password corresponding to the cloud platform account from the user. Specifically, the terminal device 110 may display a login password input interface 13 shown in FIG. 6 to the user. It should be understood that an example in which the login password is fingerprint information is used for description in FIG. 6. The login password may alternatively be information in another form such as password information or face information. A specific form of the login password is not limited in this application.

The user interface 13 may include a sub-login interface 602. The sub-login interface 602 includes a fingerprint input area 6021, a switching password input control 6022, and a cancel control 6023.

The fingerprint input area 6021 is used to remind the user to input fingerprint information in the area. The area may receive a user operation (for example, a touch operation). In response to the detected user operation, the terminal device 110 may collect the fingerprint information input by the user, that is, the login password.

The switching password input control 6022 is used to receive a user operation (for example, a touch operation). In response to the detected user operation, the terminal device 110 may display a character password input interface.

The cancel control 6023 is used to receive a user operation (for example, a touch operation). In response to the detected user operation, the terminal device 110 may return to the user interface 12.

It may be understood that FIG. 6 merely shows an example of the interface 13 used by the terminal device 110 to collect the user login password after the user taps the start control 504, and should not constitute a limitation on this embodiment of this application.

For example, as shown in FIG. 6, the user may enter the fingerprint information (that is, the login password) in the fingerprint input area 6021. The terminal device 110 detects the user operation, and in response to the user operation, sends the collected login password and the device identity of the cloud application instance 200 to an account management node 140 (that is, step S220). The account management node 140 may obtain, based on an identity account correspondence stored in a database, a cloud platform account corresponding to the device identity, obtain, based on an account password correspondence, a registration password (that is, fingerprint information input during user registration) corresponding to the cloud platform account, compare the login password with the registration password, and when the login password is consistent with the registration password, generate verification success information.

Moreover, the cloud application instance 200 may perform polling on the terminal device 110 through a connection channel (for example, a Notify event channel), to query whether the terminal device 110 has sent the login password and the device identity to the account management node 140. When it is confirmed that the login password and the device identity have been sent, the cloud application instance 200 may send a verification success information obtaining request to the account management node 140, where the obtaining request also includes the device identity of the cloud application instance 200. The account management node 140 may determine, based on the device identity, verification success information of a cloud platform account corresponding to the device identity, and then return the verification success information (which may be specifically a Token) to the cloud application instance 200 (step S230). The cloud application instance 200 may send the verification success information to an application service node 120 to request login (step S240).

After receiving the verification success information sent by an account management module 2101, the application service node 120 may send the verification success information to the account management node 140 for check. After determining that the account management node 140 records the verification success information, the account management node 140 may further determine whether the cloud platform account corresponding to the verification success information is bound to an application account. In a case in which no application account is bound, the account management node 140 sends an application account creation request to the application service node 120. The application service node 120 may create a new application account "cloud platform guest 888888", bind a newly created game archive to the application account "cloud platform guest 888888", and return the application account to the account management node 140, such that the account management node 140 may bind the application account to the cloud platform account. Finally, the application service node 120 may allow the cloud application instance 200 to log in to the application service node 120 using the newly created application account "cloud platform guest 888888". After logging in to the application service node 120, the cloud application instance 200 may send a generated audio and video stream to the terminal device 110, and the terminal device 110 may play and display the audio and video stream. For example, the terminal device 110 may display a game interface 14 shown in FIG. 7 to the user.

The game interface 14 may include a prompt box 701 and a game picture 702.

Figure 7:
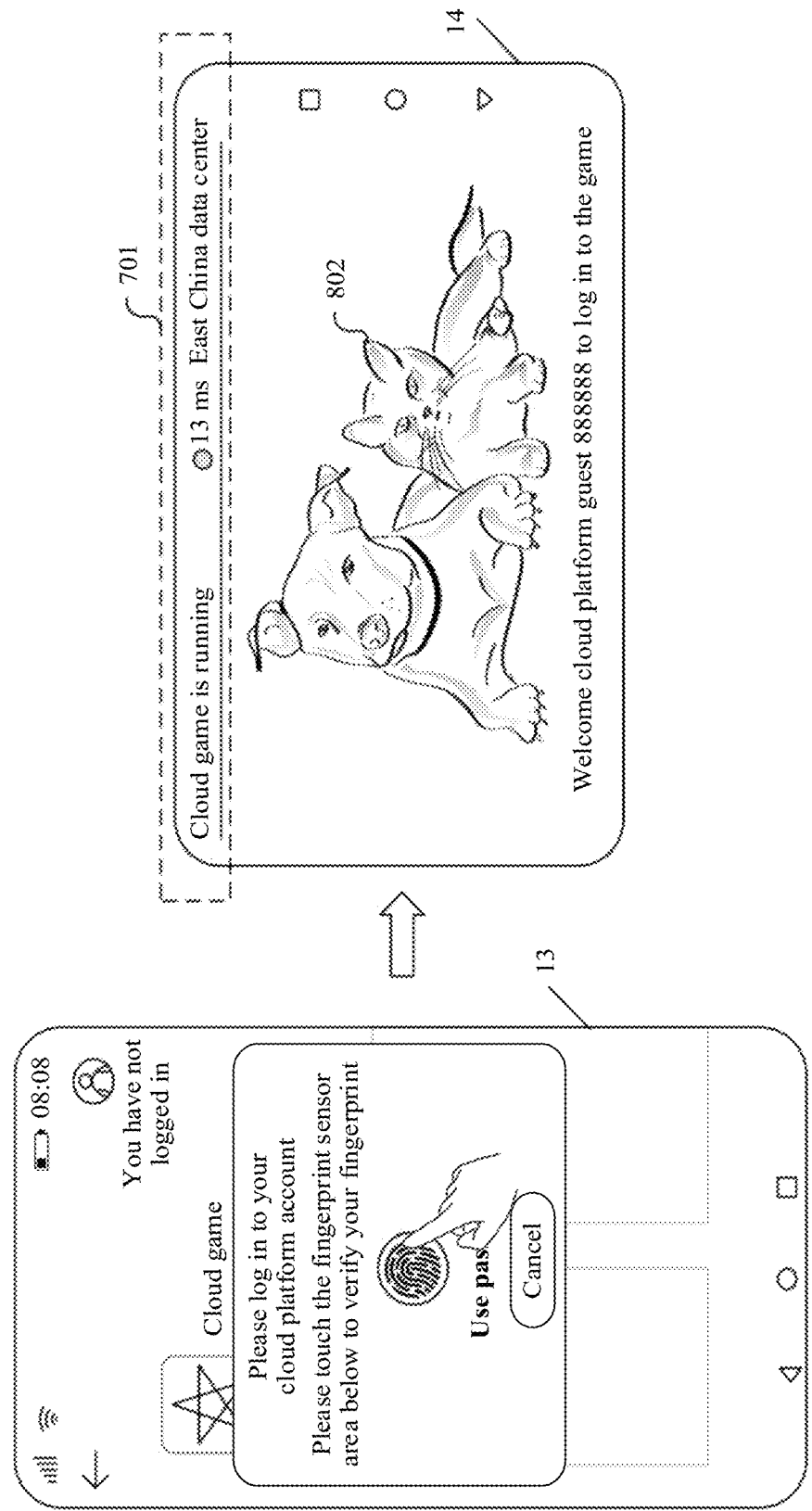

The prompt box 701 includes a plurality of elements. In FIG. 7, three elements are used as an example for description. "Cloud game is running" is used to prompt a name of a currently running cloud application, "13 ms" is used to prompt a current network delay, and "East China data center" is used to prompt an address of a data center in which the cloud application instance 200 currently running the application is located. It may be understood that if a network delay is excessively high, the user may select a closer data center or a data center with a lower network delay to reduce the network delay and improve user experience.

The game picture 702 is used to display a game picture, and the game picture may be specifically generated based on the audio and video stream sent by the cloud application instance 200.

It may be understood that FIG. 7 merely shows an example of the game interface 14 after the cloud application instance 200 logs in to the application server node 120, and should not constitute a limitation on this embodiment of this application.

It should be noted that the user operations of logging in to the application server node 120 using the cloud application instance 200 listed in FIG. 4 to FIG. 7 are not limited. There may be other user operations during specific implementation. This is not limited in this embodiment of this application.

In conclusion, in the login method based on a cloud application instance provided in this application, it can be learned from FIG. 4 to FIG. 7 that each time the user logs in to the application service node 120 using the cloud application instance 200, the user only needs to send, to the account management node 140, the login password corresponding to the cloud platform account using the terminal device 110 for verification. If the verification succeeds, the user can log in to the application service node 120, and the login password information does not need to be sent to the cloud application instance 200, thereby resolving the problem that there is a security risk when a user logs in to an application server node 120 using a cloud application instance 200, and improving user experience.

Figure 8:
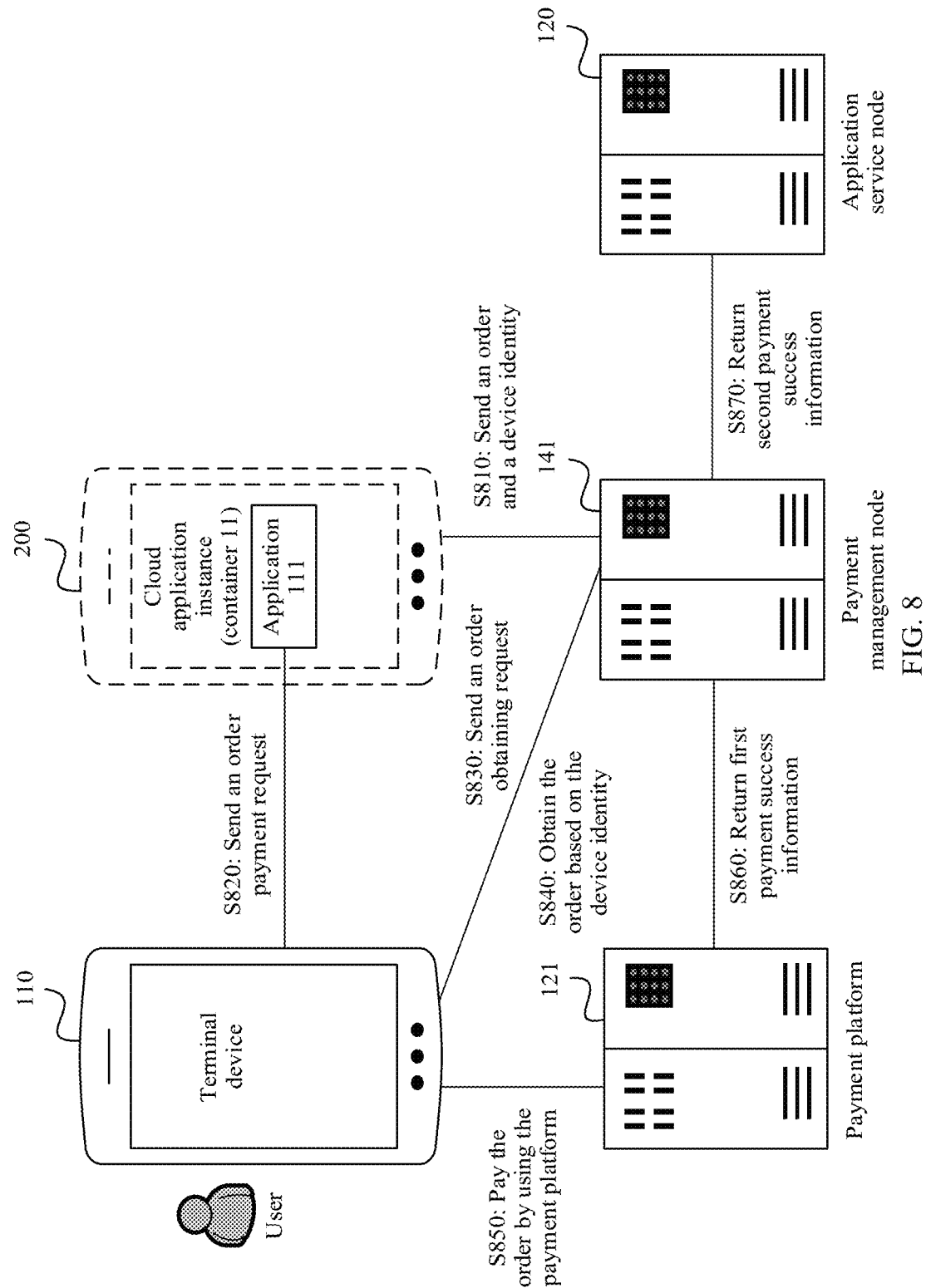
FIG. 8 is a schematic flowchart of steps of a payment method based on a cloud application instance according to this application.

The following describes a payment method based on a cloud application instance after the cloud application instance logs in to the application server node. As shown in FIG. 8, the payment method based on a cloud application instance provided in this application may include the following steps.

S810: A cloud application instance 200 sends an order and a device identity to a payment management node 141.

The order includes a price of a selling object and a payment collection account. The selling object may be a commodity purchased by a user in an application. The price is an amount payable of the order. The payment collection account may be a payment collection account of a supplier of an application service node. During specific implementation, the order may further include information used to describe the order, such as an order number, an application account of a user, a commodity name of a selling object, a discount, and a purchase quantity. For example, if an application run by a cloud application instance 200 is a game, the order may be an order generated when a user terminal 110 remotely controls the cloud application instance 200 to purchase a paid prop or virtual currency in the game. The order may include information such as an order number, an application account of the user, and a name, a quantity, a discount, and an amount payable of the paid prop or the virtual currency purchased using the account. If an application run by a cloud application instance 200 is a shopping platform application, the order may be an order generated when a terminal device 110 remotely controls the cloud application instance 200 to purchase a commodity on the shopping platform. The order may include information such as an order number, a name, a quantity, a discount, an amount payable, and a delivery address of the commodity purchased by the user. It should be understood that the foregoing example is merely used for description. This is not specifically limited in this application.

It should be understood that the device identity is a device identity obtained from a connection channel after a terminal device 110 establishes the connection channel to the cloud application instance. For specific descriptions of the device identity and the connection channel, refer to the foregoing content. Details are not described herein again.

It should be noted that the cloud application instance 200 may send the order and the device identity to the payment management node 141 through an encrypted transmission channel with very high security. The encrypted transmission channel may be implemented using an application layer (layer 7) protocol of an open systems interconnection model (OSI), for example, an existing mature communications protocol in the industry, such as the HTTP protocol and the FTP protocol. Moreover, further encryption processing is performed when data is transmitted using the application layer protocol, for example, an AES128 encryption algorithm or an RSA encryption algorithm is used, and even if the data is intercepted by an unexpected receiver, transmission content of this request cannot be easily deciphered, thereby avoiding loss of privacy information such as an order of a user when the cloud application instance 200 sends the order and the device identity to the payment management node 141, and improving security of a payment process.

In an embodiment, after the payment management node 141 receives the order and the device identity, the payment management node 141 records a first correspondence between the order and the device identity. In this way, when receiving an order obtaining request carrying the device identity that is sent by the terminal device 110, the payment management node 141 may determine, based on the previously recorded first correspondence, the order corresponding to the device identity, and then send the order to the terminal device 110. User privacy information is not transmitted between the terminal device 110 and the cloud application instance 200, and is transmitted only through the encrypted transmission channel with very high security, thereby improving privacy security in a payment process of the user.

It should be understood that, if a cloud application instance generates a plurality of orders in a short time (for example, a user continuously clicks to purchase a commodity in a short time), many orders correspond to a same device identity. Therefore, when recording the first correspondence between the order and the device identity, the payment management node 141 may further record a receiving time at which the order is received. In this way, when receiving the order obtaining request sent by the terminal device 110, if determining, based on the first correspondence, that there are a plurality of orders corresponding to the device identity, the payment management node 141 may send, to the terminal device 110, an order marked with an earliest receiving time in the plurality of orders that are not obtained by the terminal device 110.

S820: The cloud application instance 200 sends an order payment request to the terminal device 110.

The order payment request does not include the user privacy information such as the account of the user and the order, and includes only one action request. During specific implementation, the cloud application instance 200 may send the payment request to the terminal device 110 through an event channel, for example, a Notify event pipeline of the foregoing content. The event pipeline cannot transmit user privacy data, and can transmit only anonymized status information or action information. Sending a login request through the pipeline can avoid user privacy leakage and improve data transmission security. It should be understood that, according to the login method based on a cloud application instance and the payment method based on a cloud application instance provided in embodiments of this application, various action requests, such as a payment request and a login request, are transmitted between the cloud application instance 200 and the terminal device 110 only through an event channel, no information related to user privacy data is transmitted, and only anonymized information is transmitted. This can greatly ensure privacy security when a user logs in to an application server node and pays an order.

Step S830: The terminal device 110 sends, based on the order payment request, the order obtaining request carrying the device identity to the payment management node 141.

During specific implementation, the device identity of the cloud application instance may be a device identity of a cloud application instance 200 currently connected to the terminal device 110 that is obtained by the terminal device 110 through a connection channel each time after the terminal device 110 establishes the connection channel to the cloud application instance 200. The connection channel used to obtain the device identity may be an event channel used to send a payment request and a login request, or may be another connection channel used to transmit data between the cloud application instance 200 and the terminal device 110. This is not specifically limited in this application. For content that is not described in the process of obtaining the device identity, refer to step S220 in the foregoing content. Details are not described herein again.

Step S840: The payment management node 141 obtains the order from the first correspondence based on the device identity carried in the order obtaining request, and sends the order to the terminal device 110.

It may be understood that, in step S810, after receiving the order and the device identity that are sent by the cloud application instance 200, the payment management node 141 records the first correspondence between the order and the device identity. In this way, when receiving the order obtaining request carrying the device identity that is sent by the terminal device 110 in step S840, the payment management node 141 may determine, based on the previously recorded first correspondence, the order corresponding to the device identity, and then send the order to the terminal device 110.

It should be noted that the payment management node 141 may send the order and the device identity to the terminal device 110 through an encrypted transmission channel with very high security. The encrypted transmission channel may be implemented using an application layer protocol of an OSI model, for example, an existing mature communications protocol in the industry, such as the HTTP protocol and the FTP protocol. Moreover, further encryption processing is performed when data is transmitted using the application layer protocol, for example, an AES128 encryption algorithm or an RSA encryption algorithm is used, and even if the data is intercepted by an unexpected receiver, transmission content of this request cannot be easily deciphered, thereby avoiding loss of privacy information such as an order of a user, and improving security of a payment process. In this way, in step S810 to step S840, in a process in which the terminal device 110 obtains the order that needs to be paid, the order of the user is transmitted only through an existing mature secure channel in the industry, and only anonymized action information is transmitted between the cloud application instance 200 and the terminal device 110, such that a payment security coefficient is greatly improved.

Step S850: The terminal device 110 receives the order, and pays the order using a payment platform.

In an embodiment, after receiving the order sent by the payment management node 141, the terminal device 110 may first display the order on the terminal device 110 for confirmation by the user. When the user confirms that order information is correct, the terminal device 110 displays, to the user, a payment platform that can be selected by the user, to obtain an identity of a payment platform selected by the user, and a payment account and a payment password of the user on the payment platform. Finally, the terminal device 110 sends the identity of the payment platform, the payment account, and the payment password to the payment management node 141.

It should be understood that the payment platform displayed by the terminal device 110 to the user that can be selected by the user is a payment platform that is bound by the user using a cloud platform 131 before step S810. Simply speaking, the user may first bind a payment account of a payment platform commonly used by the user to a cloud platform account, and the terminal device 110 records the binding relationship. In this way, in step S850, when receiving the order and displaying the order to the user, the terminal device 110 may display the previously bound payment platform on the terminal device 110 for the user to select. After the user selects the payment platform, the terminal device 110 may obtain, based on the previously recorded binding relationship, the payment account of the payment platform previously bound by the user, and then obtain a payment password corresponding to the payment account of the payment platform from the user.

For example, before step S810, a user binds a payment account of a payment platform 1 of the user and a payment account of a payment platform 2 of the user to a cloud platform account of the user. In this case, when receiving an order and displaying the order to the user in step S860, a terminal device 110 may use the payment platform 1 and the payment platform 2 as payment platforms that can be selected by the user. Assuming that the user selects the payment platform 1, the terminal device 110 may obtain the payment account of the payment platform 1 based on a previously recorded binding relationship, and then obtain a payment password corresponding to the payment account from the user. It should be understood that the foregoing example is merely used for description, and does not constitute a specific limitation.

It should be noted that if the user sets a default payment platform for payment, the terminal device may directly obtain a payment password of the default payment platform from the user, and then send an identity of the default payment platform, and a payment account and a payment password of the default payment platform to the payment management node.

Further, because the payment account and the payment password of the payment platform of the user also belong to the privacy information of the user, when sending the payment account and the payment password of the payment platform to the payment management node 141, the terminal device 110 may encrypt the payment account and the payment password of the payment platform to generate a serial number, and then send the serial number to the payment management node 141 for processing. The payment management node 141 sends prepayment information including the serial number to a payment platform 121, the payment platform 121 may decrypt the serial number to obtain the payment account and the payment password of the user, thereby further improving security of the payment process.

S860: The payment node 121 verifies the payment password, and sends first payment success information to the payment management node 141 when the verification succeeds.

In an embodiment, after receiving an identity of the payment platform, the payment account, and the payment password that are sent by the terminal device 110, the payment management node 141 sends the payment account, the payment password, the payment collection account and the price of the selling object that are recorded in the order to the payment platform 121 based on the identity of the payment platform. When successfully verifying the payment account based on the payment password, the payment platform 121 deducts fees from the payment account and sends the first payment success information to the payment management node 141. In other words, the payment account and the payment password of the user are forwarded by the payment management node 141 to the payment platform. With reference to the foregoing content, it can be learned that the payment account and the payment password of the user may be encrypted into the serial number before being transmitted. Because the payment management node 141 cannot learn of an encryption manner, the privacy information of the user can still be ensured. It should be understood that a manner in which the payment account and the payment password of the user are forwarded by the payment management node 141 can avoid a plurality of interactions between the terminal device, the payment management node, and the payment platform, improve payment efficiency, and improve user experience.

Optionally, the terminal device 110 may alternatively send the identity of the payment platform selected by the user to the payment management node 141, and directly send the obtained payment password to the payment platform 121 for verification by bypassing the payment management node. During specific implementation, the payment management node 141 may send the prepayment information to the corresponding payment platform based on the identity of the payment platform. The prepayment information includes the payment account, the price of the selling object, and the payment collection account. Then, the payment platform generates a transaction serial number based on the prepayment information, and returns the transaction serial number to the payment management node 141. The payment management node 141 sends the transaction serial number to the terminal device 110. After obtaining the payment password of the user, the terminal device 110 sends the payment password and the transaction sequence number to the payment platform 121 together. The payment platform 121 may determine the prepayment information based on the transaction sequence number, verify the payment password based on the payment account in the prepayment information, and deduct fees from the payment account when the verification succeeds. After the fee deduction succeeds, the payment platform 121 sends the first payment success information to the payment management node 141. In a process in which the terminal device pays an order, neither the payment management node nor the cloud application instance obtains the payment password of the user, thereby greatly ensuring security of payment by the user using the cloud application instance.

The payment account in the prepayment information is a payment account of the user on the payment platform. The payment collection account may be a payment collection account of a supplier of the cloud platform 131 on the payment platform, or may be a payment collection account of a supplier of the application service node 120 on the payment platform. The price of the selling object is the amount payable of the order. It should be understood that the prepayment information generated by the payment management node 141 may further include more content, and the payment management node 141 may generate corresponding prepayment information based on a necessary parameter in a payment interface provided by each payment platform 121. For example, if a payment platform 121 needs prepayment information to include a merchant number of a merchant, a commodity description created according to a specification of the payment platform 121, and the like, prepayment information generated by a payment management node 141 further needs to include the merchant number, the commodity description, and the like. It should be understood that the foregoing example is merely used for description, and does not constitute a specific limitation.

During specific implementation, after receiving the prepayment information sent by the payment management node 141, the payment platform 121 generates the transaction serial number based on the prepayment information, records a second correspondence between the transaction serial number and the prepayment information, and then sends the transaction serial number to the payment management node 141. After receiving the transaction serial number, the payment management node 141 returns the transaction serial number to the terminal device 110. The terminal device 110 may obtain the payment password from the user based on the transaction serial number, to request payment of the order. It may be understood that, after confirming the order and selecting the payment platform, the terminal device 110 runs a payment application installed on the terminal device 110 such that the user can pay the order. The payment application corresponds to the payment platform selected by the user, and neither the payment account nor the payment password of the payment platform of the user needs to be sent to the cloud application instance 200, thereby resolving a problem that there is a security risk when a user pays an order using a cloud application instance 200.

It should be noted that, after generating the prepayment information, the payment management node 141 may record a third correspondence between the order and the prepayment information, and after receiving the transaction serial number, also record the second correspondence between the transaction serial number and the prepayment information. In this way, after the user successfully performs payment, the payment management node 141 receives the first payment success information returned by the payment platform 121. Regardless of whether the first payment success information carries the transaction serial number or the prepayment information, the order whose payment is successful may be determined based on the previously recorded second correspondence and/or the previously recorded third correspondence, such that the solutions of this application have universal applicability.

It may be understood that, if verification of the payment password fails, or verification of the payment password succeeds but payment transfer fails due to a reason such as a network failure, platform maintenance, or insufficient balance of the payment account of the user, the payment node 121 may return payment failure information to the terminal device 110, such that the user terminal 110 performs repayment.

S870: The payment management node 141 sends second payment success information to the application service node, and the application service node 120 records, based on the second payment success information, that the order takes effect, and notifies the cloud application instance that the order takes effect, such that a payment procedure based on the cloud application instance can be completed once.

For example, an application service node 120 is a game service node. A user uses an application account X to purchase a "novice gift package" worth CNY30 in a game. After receiving first payment success information sent by a payment platform Y, a payment management node 141 determines, based on the first payment success information, a successfully paid order, that is, an order in which the application account X purchases the "novice gift package" worth CNY30 in the game, then, the payment management node 141 sends second payment success information to the game service node. The game service node may validate the order based on the second payment success information, and send the "novice gift package" to a game package of the application account. A cloud application instance 200 may send an audio and video stream to a terminal device 110, and the terminal device 110 displays the "novice gift package" on a game package interface of the user.

In an embodiment, after the payment management node 141 receives the first payment success information, if the first payment success information includes only the transaction serial number, the payment management node 141 may determine, based on the transaction serial number in the first payment success information and the previously recorded second correspondence, the prepayment information corresponding to the transaction serial number, then determine, based on the prepayment information and the previously recorded third correspondence, the order corresponding to the prepayment information, and send the second payment success information to the application service node 120. If the first payment success information includes the prepayment information, the payment management node 141 may directly determine, based on the third correspondence, the order corresponding to the prepayment information, and then send the second payment success information to the application service node 120. It should be understood that a specific process in which the payment management node 141 determines the successfully paid order based on the first payment success information is not limited in this application.

It should be noted that the second payment success information generated by the payment management node 141 is used to notify the application service node 120 that the order has been paid. Therefore, the second payment success information may include some information of the order, or may include complete content of the order. This is not limited in this application. For example, second payment success information may include an order number. After receiving the second payment success information, an application service node 120 may determine a successfully paid order based on the order number, and then generate order effective information. It should be understood that the example is merely used for description, and specific content in the second payment success information is not limited in this application.

It should be noted that the account management node 140 in step S210 to step S240 and the payment management node 141 in step S810 to step S870 may be a same node, or may be two nodes in different geographical locations. One is responsible for processing the login procedure in step S210 to step S240, and the other is responsible for processing the payment procedure in step S810 to step S870. This is not specifically limited in this application.

In conclusion, in the payment method based on a cloud application instance 200 provided in this application, the cloud application instance sends a to-be-paid order of the user to the payment management node, and then the terminal device held by the user obtains the order from the payment management node, and pays the order using the payment application running on the terminal device. In this entire payment process, the cloud application instance does not receive any payment-related information of the user, for example, the payment account and the payment password of the payment platform. This greatly ensures security of payment by the user using the cloud application instance.

Figure 9B:
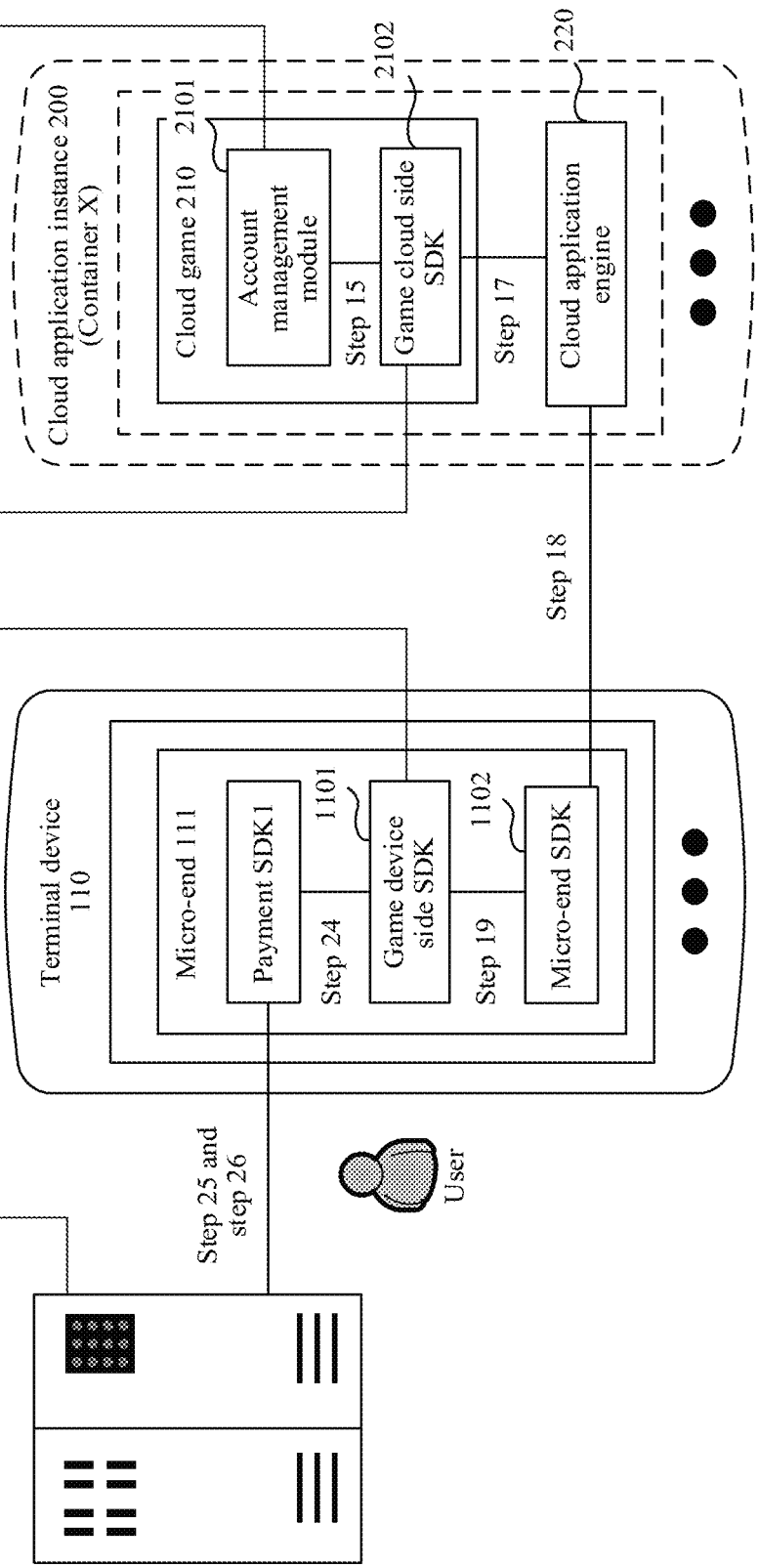

It is assumed that, in the application scenario shown in FIG. 3A and FIG. 3B, after a user logs in to an application service node 120 using a cloud application instance 200 by performing step 1 to step 14, in a process of playing a game using a cloud application instance 200, the user needs to purchase a service in an application, for example, a "40 yuan novice gift package". With reference to FIG. 9A and FIG. 9B, the following describes steps of the payment method based on a cloud application instance provided in this application in the application scenario.

Step 15: An account management module 2101 sends a payment request to a game cloud side SDK 2102.

The payment request may be generated in a process in which a terminal device 110 remotely operates the cloud application instance 200. The payment request may include an order. The order may specifically include information such as an order number, an application account of a user, and a name (Novice gift package CNY50), a quantity (one piece), a discount (a 10 yuan discount), a payment collection account (a payment collection account of an operator of a cloud game), and an amount payable (CNY40).

Step 16: The game cloud side SDK 2102 sends the order to a payment management node 141.

During specific implementation, the SDK 2102 on the game cloud side may further send a device identity of the cloud application instance 200 to the payment management node 141, and the payment management node 141 records a first correspondence between the device identity and the order.

It should be noted that, for content that is not described in step 15 and step 16, refer to step S810 in the foregoing content. Details are not described herein again.

Step 17: The game cloud side SDK 2102 sends an order payment request to a cloud application engine 220.

Step 18: The cloud application engine 220 sends the order payment request to a micro-end SDK 1102 on the terminal device 110.

During specific implementation, the cloud application engine 220 may send the order payment request to the micro-end SDK 1102 through an event channel that is in the foregoing content and that is used to transmit anonymized information such as event information and status information, for example, a Notify event channel.

Step 19: The micro-end SDK 1102 sends the order payment request to a game device side SDK 1101.

It should be noted that, for content that is not described in step 17 to step 19, refer to step S820 in the foregoing content. Details are not described herein again.

Step 20: The game side SDK 1101 sends, based on the order payment request, an order obtaining request carrying the device identity to the payment management node 141, and the payment management node 141 obtains the order from the first correspondence based on the device identity carried in the order obtaining request, and returns the order to the game device side SDK.

During specific implementation, the device identity is a device identity of the cloud application instance 200 that is obtained by the terminal device 110 from a connection channel after the cloud application instance 200 establishes the connection channel to the terminal device 110. For details, refer to the foregoing content. Details are not described herein again.

Step 21: The game device side SDK 1101 confirms with the user whether order information is accurate. Specifically, the game device side SDK 1101 generates an order page and displays the order page to the user, such that the user can confirm whether the order information is correct.

Step 22: After the user confirms that the order information is correct, the game device side SDK 1101 sends an identity of a payment platform selected by the user and a payment account of the payment platform to the payment management node 141.

During specific implementation, after the user confirms that the order information is correct, the game device side SDK 1101 displays a selectable payment platform to the user, and then sends the identity of the payment platform selected by the user and the payment account of the user on the payment platform to the payment management node 141. The payment platform displayed by the game device side SDK 1101 is a payment platform that has been bound by the user using a cloud platform 131 before step 15. Simply speaking, the user may first bind a payment account of a payment platform commonly used by the user to a cloud platform account, and the terminal device 110 records the binding relationship. In this way, when receiving the order and displaying the order to the user, the terminal device 110 may display the previously bound payment platform on the terminal device 110 for the user to select. After the user selects the payment platform, the terminal device 110 may obtain, based on the previously recorded binding relationship, the payment account of the payment platform previously bound by the user. FIG. 9A and FIG. 9B are described using an example in which the user selects a payment platform 1 to pay the order. Therefore, in step 22, the game device side SDK 1101 sends an identity of the payment platform 1 and a payment account of the payment platform 1 to the payment management node 141.

It should be noted that, if the user sets that the payment platform 1 is used to pay the order by default, the game device side SDK 1101 may no longer display the bound payment platform to the user, and directly send the identity and the payment account of the default payment platform 1 to the payment management node 141.

Step 23: The payment management node 141 sends prepayment information to the payment platform 1 based on the identity of the payment platform 1. The prepayment information includes the payment account of the payment platform 1, a price (that is, CNY40) of a selling object, and a payment collection account of the cloud platform on the payment platform 1.

It should be understood that the prepayment information further includes some necessary information that is officially provided by the payment platform 1 and that is needed for invoking a payment interface, for example, other information used to describe an order, such as a merchant number, a device number, a commodity description, an order number, and a total order amount.

Step 24: The payment platform 1 generates a transaction serial number based on the prepayment information, records a second correspondence between the transaction serial number and the prepayment information, and returns the transaction serial number to the payment management node 141.

Step 25: The payment management node 141 receives the transaction serial number, records the second correspondence between the transaction serial number and the prepayment information, records a third correspondence between the prepayment information and the order, and sends the transaction serial number to the game device side SDK 1101 of the terminal device 110.

It should be noted that, for content that is not described in step 20 to step 25, refer to step S830 to step S840 in the foregoing content. Details are not described herein again.

Step 26: The game device side SDK 1101 sends the transaction serial number to a payment SDK 1, and after collecting a payment password of the user, the payment SDK sends the payment password and the transaction serial number to the payment platform 1.

It should be understood that a plurality of payment SDKs may be installed on the terminal device 110, and are separately connected to different payment platforms. In FIG. 9A and FIG. 9B, an example in which the payment platform 1 is connected to the payment SDK 1 is used for description. A quantity of the payment SDKs is not limited in this application.

Step 27: The payment platform 1 obtains, based on the transaction serial number and the second correspondence (the second correspondence between the transaction serial number and the prepayment information recorded in step 24), the prepayment information corresponding to the transaction serial number, verifies the payment password based on the payment account in the prepayment information, deducts fees from the payment account when the verification succeeds, and sends first payment success information to the payment management node 141 when the deduction succeeds. The first payment success information includes the transaction serial number.

It should be noted that, for content that is not described in step 25 to step 27, refer to step S850 in the foregoing content. Details are not described herein again.

Step 28: The payment management node 141 determines, based on the transaction serial number in the first payment success information and the recorded second correspondence (the second correspondence between the transaction serial number and the prepayment information recorded in step 25), the prepayment information corresponding to the transaction serial number, determines, based on the prepayment information and the recorded third correspondence (the third correspondence between the prepayment information and the order recorded in step 25), the order corresponding to the prepayment information, and sends second payment success information to the application service node 120 based on the order, where the second payment success information includes an order number.

It should be noted that, for content that is not described in step 28, refer to step S860 in the foregoing content. Details are not described herein again.

Step 29: The application service node 120 determines, based on the order number in the second payment success information, an order that is successfully paid by the user, then validates the order, actually installs a "50 yuan novice gift package" purchased by the user under an application account of the user, and generates order effective information.

Step 30: The payment SDK 1 receives third payment success information sent by the payment platform 1. During specific implementation, step 30 and step 27 may be performed simultaneously, or may be performed non-simultaneously. This is not specifically limited in this application.

Step 31: The cloud application engine 220 performs polling on the micro-end SDK 1102, to determine whether the terminal device 110 receives the third payment success information sent by the payment platform 1. A channel used for polling may also be an event channel used to transmit anonymized information in the foregoing content, for example, a Notify event channel.

During specific implementation, step 31 may be performed after step 16 ends. To be specific, after the game cloud side SDK 2102 of the cloud application instance 200 sends the order and the device identity to the payment management node 141, the cloud application engine 220 may start to continuously perform polling on the micro-end SDK 1102.

Step 32: After confirming that the terminal device 110 receives the third payment success information sent by the payment platform 1, the cloud application engine 220 notifies the account management module 2101 that order payment succeeds, the account management module 2101 obtains the order effective information from the application service node 120, the cloud application instance 200 may generate an audio and video stream, and send the audio and video stream to the terminal device, and the terminal device 110 may display an order payment success page.

It should be noted that, for content that is not described in step 29 to step 32, refer to step S870 in the foregoing content. Details are not described herein again.

In the method, the cloud application instance sends a to-be-paid order of the user to the payment management node, and then the terminal device held by the user obtains the order from the payment management node, and pays the order using the payment application running on the terminal device. In this entire payment process, the cloud application instance does not receive any payment-related information of the user, for example, the payment account and the payment password of the payment platform. This greatly ensures security of payment by the user using the cloud application instance.

For ease of understanding beneficial effects of the payment method based on a cloud application instance provided in this embodiment of this application, the application scenario described in FIG. 9A and FIG. 9B is used as an example to describe some example graphical user interfaces in the process of step 15 to step 32.

Figure 10:
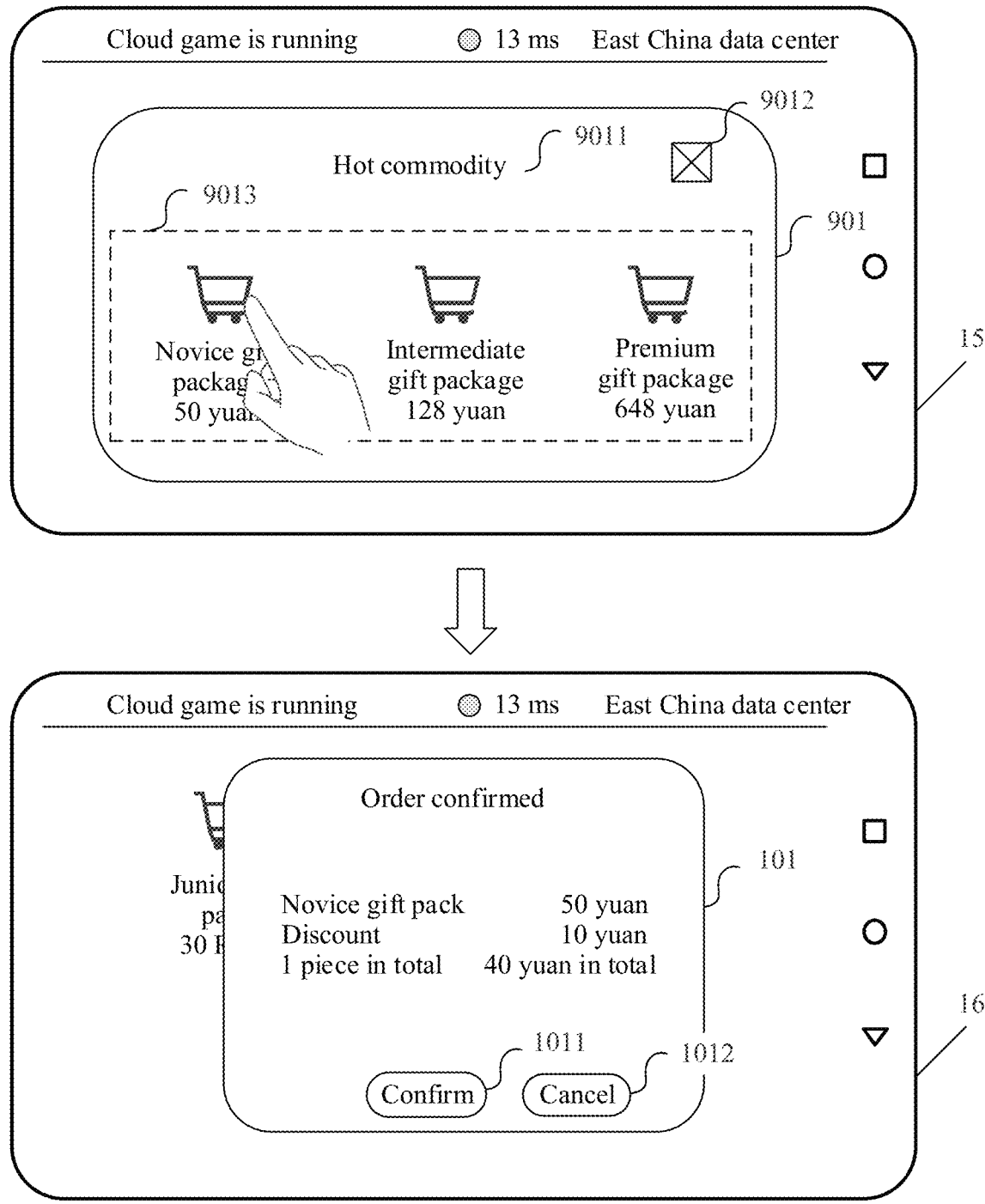
FIG. 10 to FIG. 15 are schematic diagrams of embodiments of some user interfaces in a payment method based on a cloud application instance according to this application.

FIG. 10 shows an example of a mall interface 15 of a cloud game of a terminal device 110. The mall interface is generated by the terminal device 110 based on an audio and video stream sent by a cloud application instance 200, and the mall interface 15 may include a hot commodity display box 901. The hot commodity display box 901 may include a title bar 9011, a close control 9012, and a plurality of commodity controls 9013.

The title bar 9011 is configured to display a current commodity category, and a representation form of the title bar 9011 may be text information, an icon, or another form.

The close control 9012 may receive a user operation (for example, a touch operation), and in response to the detected user operation, the current mall interface 15 is closed.

The plurality of commodity controls 9013 are configured to display icons of commodities that can be purchased. Each icon may receive a user operation (for example, a touch operation). In response to the detected user operation, the terminal device may send the user operation to the cloud application instance, and the cloud application instance may generate a corresponding order, and then send the order to a payment management node 141.

It may be understood that FIG. 10 merely shows an example of an interface of a cloud platform application of the terminal device 110, and should not constitute a limitation on this embodiment of this application.

For example, as shown in FIG. 10, a user may tap "Novice gift package 50 yuan" in a plurality of commodity controls 9013. A terminal device 110 detects the user operation, and sends the user operation to a cloud application instance 200. In response to the user operation, the cloud application instance may generate an order for the user to purchase the "Novice gift package 50 yuan", send the order and a device identity to a payment management node 141, and send an order payment request to the terminal device 110 (for details, refer to step S810 to step S820 and step 15 to step 18 in the foregoing content). In response to the payment request, the terminal device 110 may obtain the order from the payment management node 141. The terminal device 110 displays an order confirmation interface 16 shown in FIG. 10 to the user.

The order confirmation interface 16 may include an order confirmation display box 101. The order confirmation display box 101 includes a confirmation control 1011 and a cancel control 1012.

The confirmation control 1011 may receive a user operation (for example, a touch operation), and the terminal device 110 may generate an order confirmation message in response to the detected user operation. If the user does not set a default payment platform, the terminal device 110 may further generate a payment platform selection interface 17 in response to the user operation. The page is described below.

The cancel control 1012 is used to receive a user operation (for example, a touch operation). In response to the detected user operation, the terminal device 110 may close the current order confirmation interface 16, and return to a previous user interface, for example, an interface 15.

The order confirmation display box 101 may further include a plurality of elements. In FIG. 10, three elements are used as an example for description. "Novice gift package" and "50 yuan" are used to confirm, to the user, whether a name of a purchased commodity is correct, "Discount" and "10 yuan" are used to confirm, to the user, whether discount information of the purchased commodity is correct, and "1 piece in total" and "40 yuan in total" are used to confirm, to the user, whether a quantity and an amount of the purchased commodity are correct. The order confirmation display box 101 may further include more elements, and examples are not described one by one herein.

It may be understood that FIG. 10 merely shows an example of the order confirmation interface 15, and should not constitute a limitation on this embodiment of this application.

Figure 11:
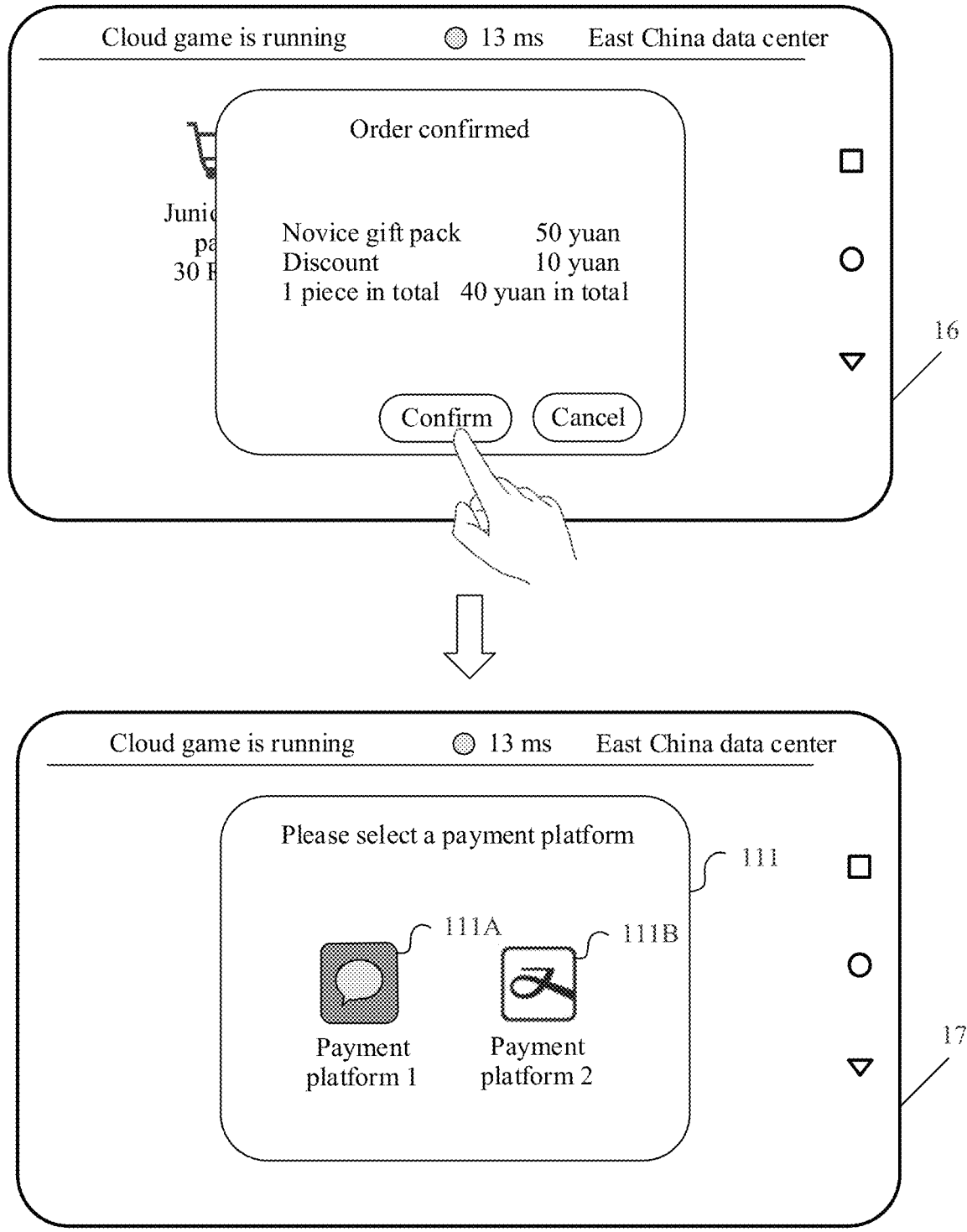

For example, as shown in FIG. 11, a user may tap a confirmation control 1011. A terminal device 110 detects the user operation. In response to the user operation, the terminal device may display a payment platform selection interface 17 shown in FIG. 11 to the user.

Figure 12:
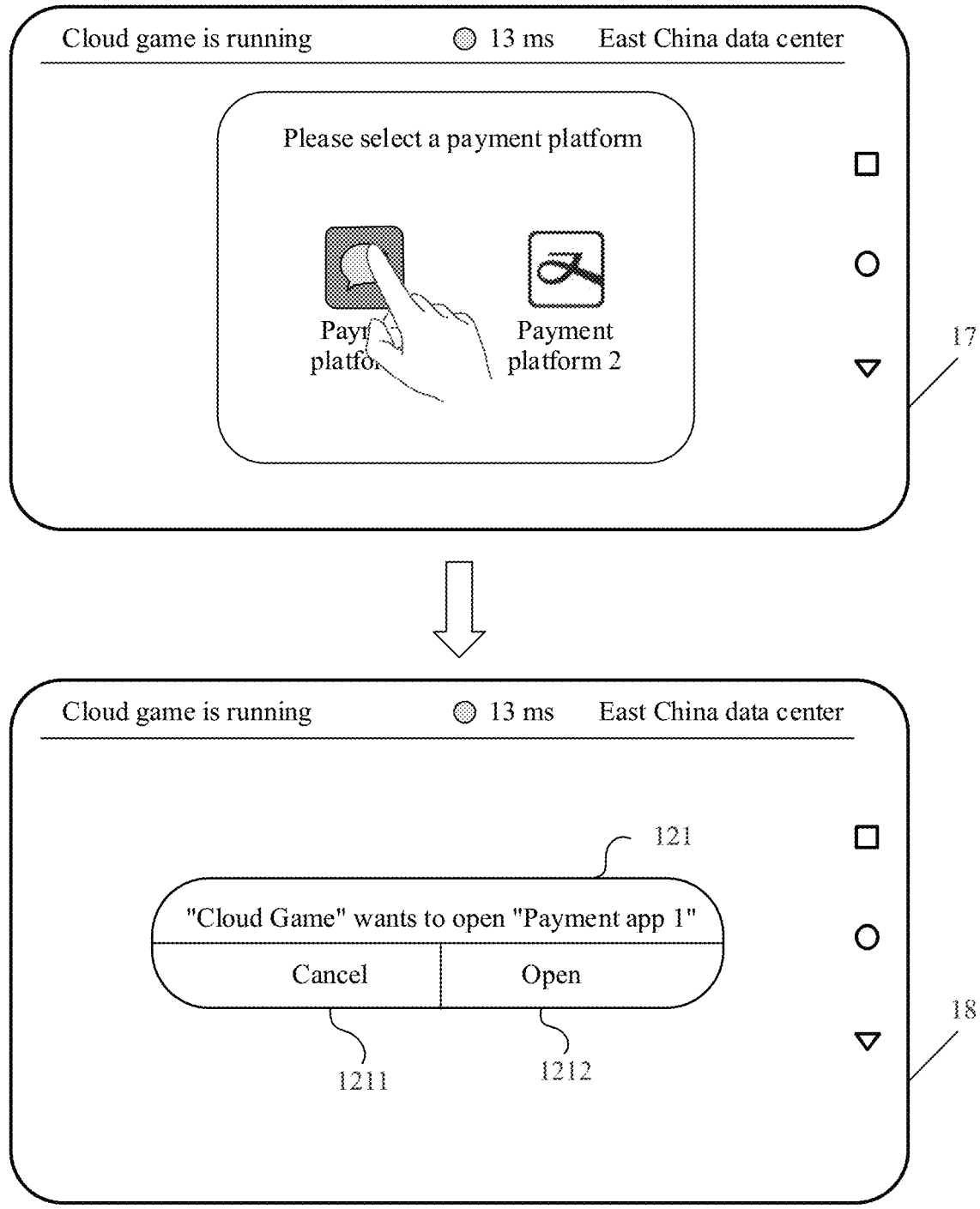

The payment platform selection interface 17 may include a payment platform display box 111. The payment platform display box 111 may include a plurality of payment platform controls. Each payment platform control may receive a user operation (for example, a touch operation). In response to the detected user operation, the terminal device 110 may send both an identity of a payment platform selected by the user and a payment account of the payment platform to a payment management node 141, and start a corresponding payment application to pay for an order. In FIG. 12, two payment platforms are used as an example for description, and are respectively a control of a payment platform 1 and a control of a payment platform 2.

It should be noted that the payment platforms that can be selected by the user and that is displayed in the payment platform display box 111 are payment platforms that have been bound by the user to a cloud platform. Simply speaking, before the user starts to place an order in an application, the user has bound a cloud platform account to a required payment account of the payment platform 1 and a required payment account of the payment platform 2. Therefore, the payment platform display box 111 only displays two payment platforms, the payment platform 1 and the payment platform 2, for the user to select.

It may be understood that FIG. 11 merely shows an example of the payment platform selection interface 17 of the terminal device 110, and should not constitute a limitation on this embodiment of this application.

For example, as shown in FIG. 12, the user may tap a control of a payment application 1 in the payment platform display box 111. The terminal device 110 detects the user operation. In response to the user operation, the terminal device 110 may send, to the payment management node 141, an identity of the payment platform 1 corresponding to the payment application 1 selected by the user and the payment account of the payment platform 1. The payment management node 141 generates prepayment information (including at least an amount payable, a payment account, and a payment collection account, where the payment account is the payment account of the user, and the payment collection account may be a payment collection account of an application service node provider, or may be a payment collection account of a cloud platform provider, which is not specifically limited in this application) based on the identity of the payment platform 1 selected by the user and the payment account of the payment platform 1, and then sends the prepayment information to the payment platform 1 corresponding to the identity of the payment platform 1. After generating a transaction serial number based on the prepayment information, the payment platform 1 returns the transaction serial number to the payment management node 141. After the payment management node 141 sends the transaction serial number to the terminal device 110, the terminal device 110 may start the local payment application 1 to perform an order payment operation. For example, the terminal device 110 may display a prompt interface 18 shown in FIG. 12.

The prompt interface 18 may include a prompt box 121. The prompt box 121 is used to prompt the user whether to start the payment application 1 to pay for the order. The prompt box 121 may include a cancel control 1211 and an open control 1212.

The cancel control 1211 may receive a user operation (for example, a touch operation). In response to the detected user operation, the terminal device 110 may cancel starting of the payment application 1, and display a previous user interface of the prompt interface 18, for example, a user interface 17.

The open control 1212 may receive a user operation (for example, a touch operation). In response to the detected user operation, the terminal device 110 may start the payment application 1, and display a payment interface of the payment application 1 to the user.

It may be understood that FIG. 12 merely shows an example of the prompt interface 18 of the terminal device 110, and should not constitute a limitation on this embodiment of this application.

Figure 13:
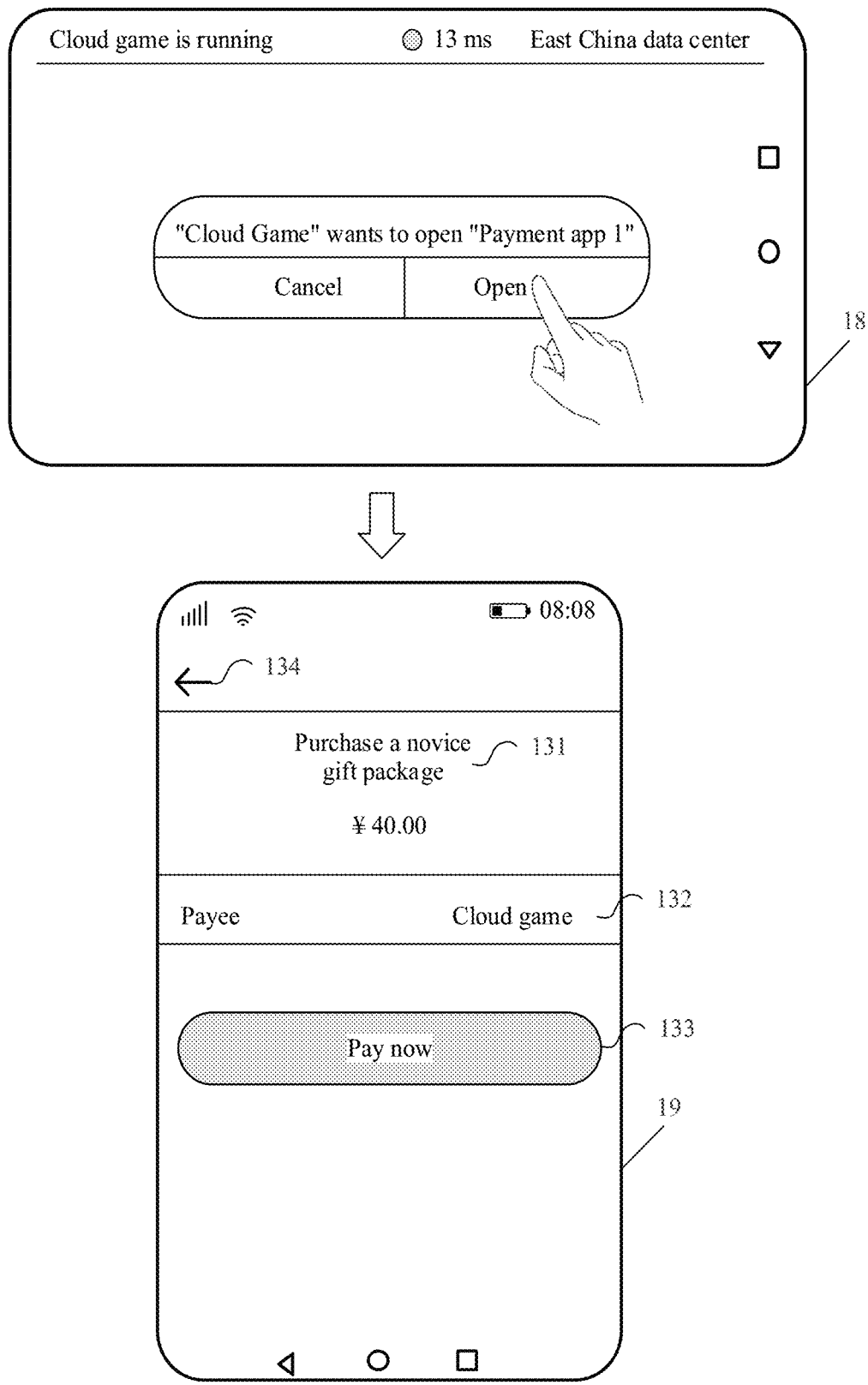

For example, as shown in FIG. 13, a user may tap an open control 1212. A terminal device 110 detects the user operation. In response to the user operation, the terminal device 110 starts a payment application 1 installed on the terminal device 110, to display a payment interface 19 shown in FIG. 13.

The payment interface 19 may include a title bar 131, a payment collection prompt box 132, a payment control 133, and a return control 134.

The title bar 131 may be used to indicate that the current page is used to display a name of a purchased commodity in a to-be-paid order, a payment amount, and the like. The title bar 131 may further include more elements. In FIG. 13, the commodity name and the payment amount are used as an example for description. This is not specifically limited in this application.

The payment collection prompt box 132 may be configured to display information about the payee to the user. In FIG. 13, an example in which a payment collection account of the payee is "cloud game" is used for description. During specific implementation, the payment collection prompt box 132 may further include more content, for example, a merchant number and an order number of the payee. This is not specifically limited in this application.

The payment control 133 may receive a user operation (for example, a touch operation). In response to the detected user operation, the terminal device 110 may display a payment password input interface 20 to the user.

The return control 134 may receive a user operation (for example, a touch operation). In response to the detected user operation, the terminal device 110 may return to a game interface 15 of the "cloud game".

It may be understood that FIG. 13 merely shows an example of the payment interface 19 of the terminal device 110, and should not constitute a limitation on this embodiment of this application.

Figure 14:
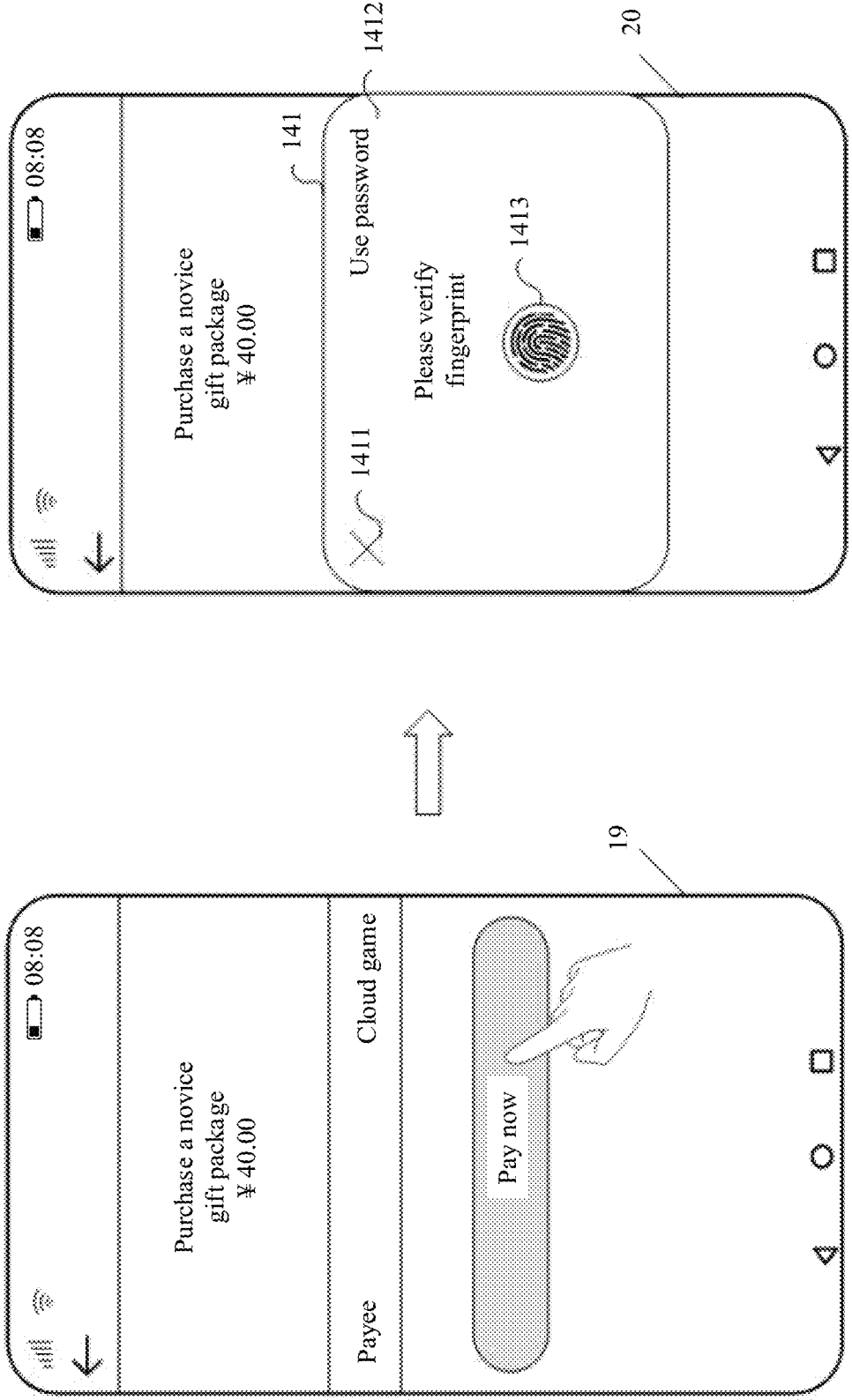

For example, as shown in FIG. 14, a user may tap a payment control 133. A terminal device 110 detects the user operation. In response to the user operation, the terminal device 110 displays a payment password input interface 20 shown in FIG. 14 to the user. It should be understood that an example in which a login password is fingerprint information is used for description in FIG. 14. The login password may alternatively be information in another form such as password information or face information. A specific form of the login password is not limited in this application.

The payment password input interface 20 may include a payment sub-interface 141. The payment sub-interface 141 includes a closing control 1411, a switching password input control 1412, and a fingerprint input area 1413.

The closing control 1411 is used to receive a user operation (for example, a touch operation). In response to the detected user operation, the terminal device 110 may return to the payment interface 19.

The switching password input control 1412 is used to receive a user operation (for example, a touch operation). In response to the detected user operation, the terminal device 110 may display a character password input interface.

The fingerprint input area 1413 is used to remind the user to input the fingerprint information in the area. The area may receive a user operation (for example, a touch operation). In response to the detected user operation, the terminal device 110 may collect the fingerprint information input by the user, that is, the payment password.

It may be understood that FIG. 14 merely shows an example of the interface 20 used by the terminal device 110 to collect the user payment password after the user taps the payment control 133, and should not constitute a limitation on this embodiment of this application.

Figure 15:
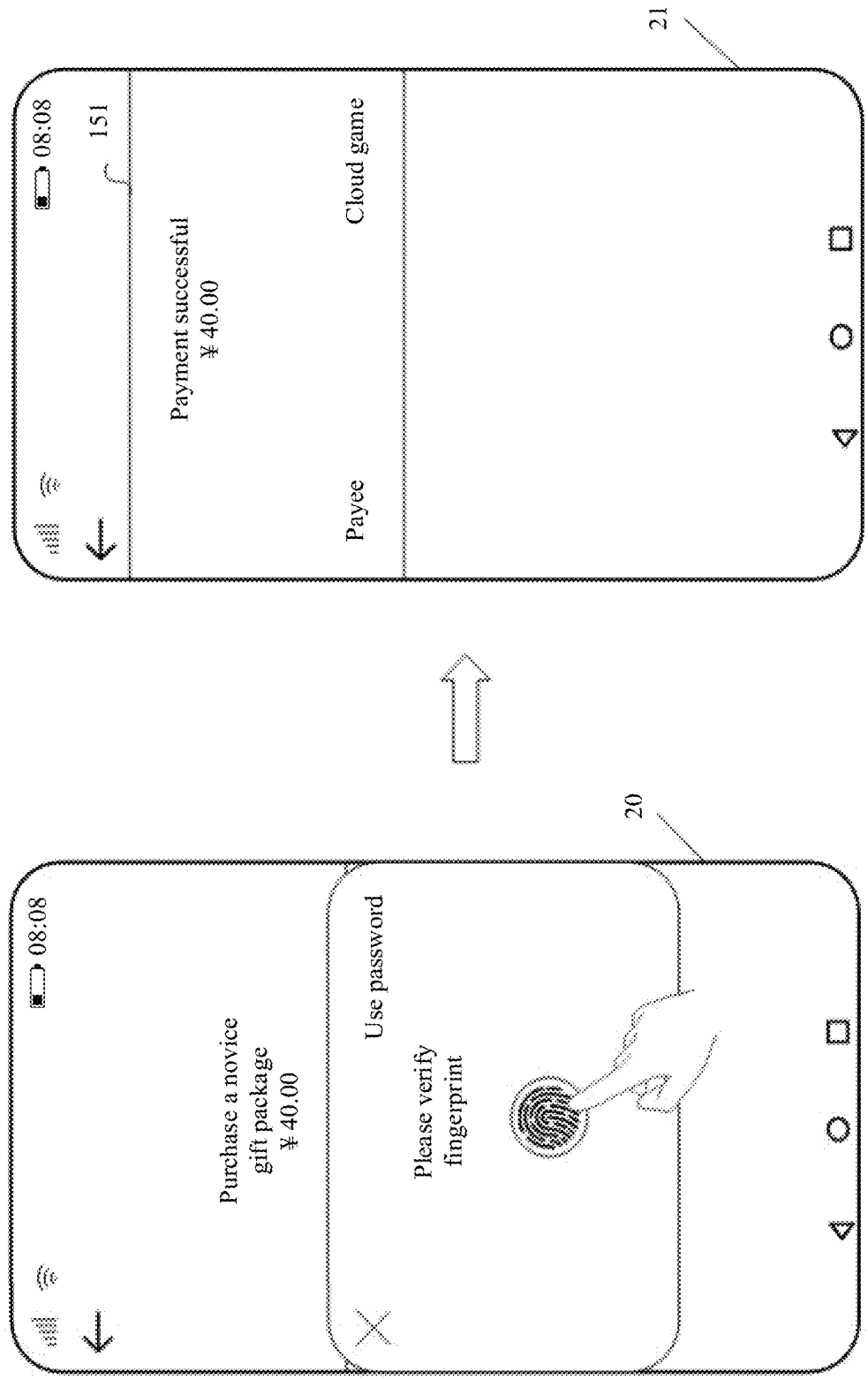

For example, as shown in FIG. 15, a user may input fingerprint information (that is, a payment password) in a fingerprint input area 1413. A terminal device 110 detects the user operation, and sends, in response to the user operation, the collected payment password and a previously received transaction serial number to a payment platform 1. The payment platform 1 may obtain prepayment information based on the transaction serial number and a recorded third correspondence, and when successfully verifying a payment account based on the payment password, transfer a payment in the payment account to a payment collection account, the payment is a payment of a "novice gift package" purchased by the user. When the payment transfer succeeds, the payment platform sends third payment success information to the user terminal 110, and the user terminal 110 may display a payment success interface 21 shown in FIG. 15.

Figure 16:
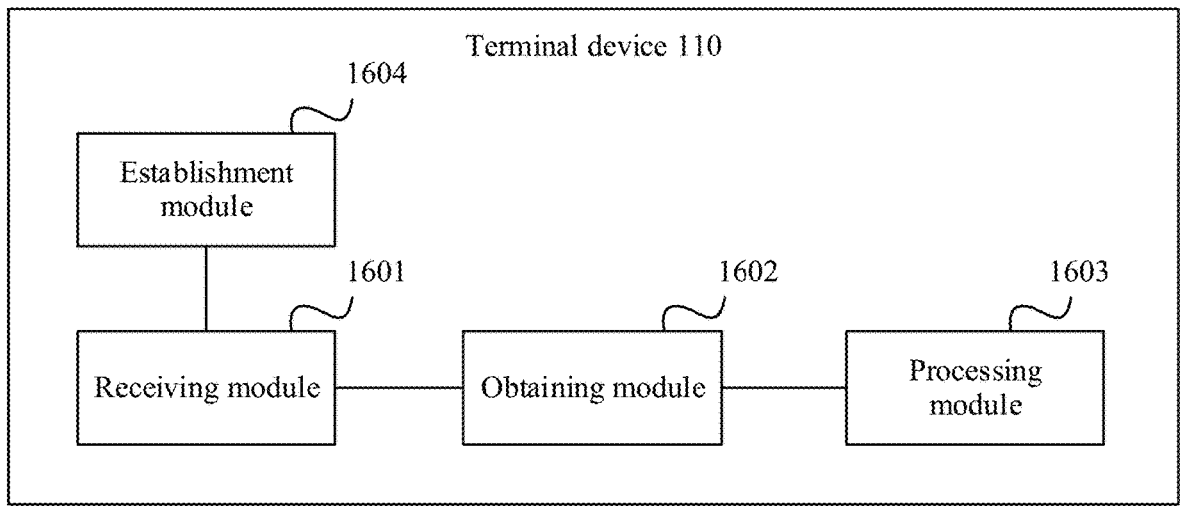
FIG. 16 is a schematic diagram of a structure of a terminal device according to this application.

The payment success interface 21 includes a payment success prompt box 151. The prompt box 151 may include a plurality of elements. In FIG. 16, three elements are used as an example for description. "Paid successfully" is used to notify a user that a current order has been successfully paid, "Y 40.00" is used to notify the user of a payment amount, and "Payee Cloud game" is used to notify the user of a name of a payee. The payment success prompt box 151 may further include more elements, and examples are not described one by one herein.

It should be understood that, when sending the third payment success information to the user terminal 110, the payment platform may further send first payment success information to a payment management node 140, where the first payment success information includes the transaction serial number. The payment management node 140 may obtain, based on the transaction serial number and a recorded second correspondence, the prepayment information corresponding to the transaction serial number, and then determine, based on the recorded third correspondence, the order corresponding to the prepayment information, to generate second payment success information, and send the second payment success information to an application service node 120, to notify the application service node 120 that the order is paid successfully. The second payment success information may carry some information of the order, for example, information such as an order number, an application account of the user, and a name of a purchased commodity, such that the application service node 120 can validate the order based on the second payment success information, and deliver the "50-yuan novice gift package" purchased by the user to the application account of the user.

For example, a user may tap a return control 131 in an interface 21, and after returning to a cloud game interface, the user may see that a purchased "novice gift package" already exists in a game package. It should be understood that the foregoing example is merely used for description, and does not constitute a specific limitation.

It may be understood that FIG. 15 merely shows an example of the payment success interface 21, and should not constitute a limitation on this embodiment of this application.

It should be noted that the user operations in the payment method based on a cloud application instance 200 listed in FIG. 10 to FIG. 15 are not limited. There may be other user operations during specific implementation. This is not limited in this embodiment of this application.

It can be learned from FIG. 10 to FIG. 15 that, in the payment method based on a cloud application instance provided in this application, when a user pays an order using the cloud application instance, the user starts a payment application installed on a terminal device 110 to pay the order, instead of remotely operating the cloud application instance to pay the order. This greatly ensures security of payment by the user using the cloud application instance, and improves user experience.

The method in embodiments of this application is described in detail above. For ease of better implementing the solutions in embodiments of this application, correspondingly, related devices used to cooperate in implementing the solutions are further provided below.

FIG. 16 is a schematic diagram of a structure of a terminal device 110 provided in this application. As shown in FIG. 16, the terminal device 110 provided in this application may include a receiving module 1601, an obtaining module 1602, a processing module 1603, and an establishment module 1604.

The receiving module 1601 is configured to receive an order payment request sent by a cloud application instance.

The obtaining module 1602 is configured to send, based on the order payment request, an order obtaining request carrying a device identity of the cloud application instance to a payment management node, where the payment management node records a correspondence between the order and the device identity.

The receiving module 1601 is configured to receive the order sent by the payment management node based on the order obtaining request.

The processing module 1603 configured to process the order.

In an embodiment, the establishment module 1604 is configured to: before the receiving module 1601 receives the order payment request sent by the cloud application instance, establish a connection channel to the cloud application instance, and obtain the device identity of the cloud application instance from the connection channel.

In an embodiment, the processing module 1603 is configured to display the order; the processing module 1603 is configured to obtain an identity of a payment platform selected by a user, and a payment account and a payment password of the user on the payment platform; and the processing module 1603 is configured to send the identity of the payment platform, the payment account, and the payment password to the payment management node.

It should be understood that internal unit modules of the terminal device 110 shown in FIG. 16 may also be divided into a plurality of types, and the modules may be software modules, or may be hardware modules, or some may be software modules and the other may be hardware modules. This is not limited in this application. FIG. 16 is an example of a division manner. This is not specifically limited in this application.

According to the terminal device provided in this application, each time a user pays an order using a cloud application instance, the cloud application instance sends the order to a payment management node, and the terminal device obtains, from the payment management node, the order that needs to be paid, and pays the order using payment software installed on the terminal device. In this entire payment process, the cloud application instance does not receive any privacy information related to payment of the user, for example, a payment account and a payment password of the payment platform. This greatly ensures security of payment by the user using the cloud application instance.

Figure 17:
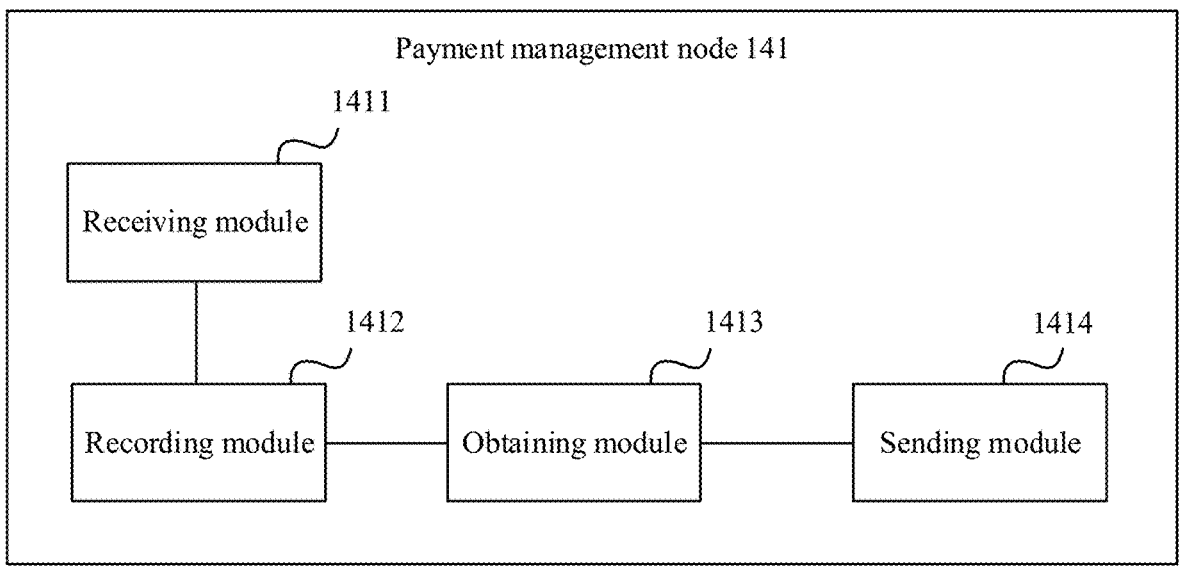
FIG. 17 is a schematic diagram of a structure of a payment management node according to this application.

FIG. 17 is a schematic diagram of a structure of a payment management node 141 according to this application. As shown in FIG. 17, the payment management node 141 includes a receiving module 1411, a recording module 1412, an obtaining module 1413, and a sending module 1414.

The receiving module 1411 is configured to receive an order and a device identity that are sent by a cloud application instance.

The recording module 1412 records a correspondence between the order and the device identity.

The receiving module 1411 is configured to receive an order obtaining request sent by a terminal device, where the order obtaining request is generated after the terminal device receives an order payment request sent by the cloud application instance, and the order obtaining request carries the device identity.

The obtaining module 1413 is configured to obtain the order from the correspondence between the order and the device identity based on the device identity carried in the order obtaining request.

The sending module 1414 sends the order to the terminal device, such that the terminal device receives and processes the order.

In an embodiment, the receiving module 1411 is configured to receive an identity of a payment platform, a payment account, and a payment password that are sent by the terminal device, where the identity of the payment platform is an identity of a payment platform selected by a user, and the payment account and the payment password are obtained by the terminal device from the user; the sending module 1414 is configured to send, to the payment platform based on the identity of the payment platform, the payment account, the payment password, a payment collection account, and a price of a selling object that are recorded in the order; the receiving module 1411 is configured to: when the payment platform successfully verifies the payment account based on the payment password, receive first payment success information sent by the payment platform; and the sending module 1414 is configured to send second payment information to an application service node, such that the application service node records, based on second payment success information, that the order takes effect.

It should be understood that internal unit modules of the payment management node 141 shown in FIG. 17 may also be divided into a plurality of types, and the modules may be software modules, or may be hardware modules, or some may be software modules and the other may be hardware modules. This is not limited in this application. FIG. 17 is an example of a division manner. This is not specifically limited in this application.

According to the payment management node provided in this application, each time a user pays an order using a cloud application instance, the cloud application instance sends the order to the payment management node, and then a terminal device obtains, from the payment management node, an order that needs to be paid, and pays the order using payment software installed on the terminal device. In this entire payment process, the cloud application instance does not receive any privacy information related to payment of the user, for example, a payment account and a payment password of the payment platform. This greatly ensures security of payment by the user using the cloud application instance.

Figure 18:
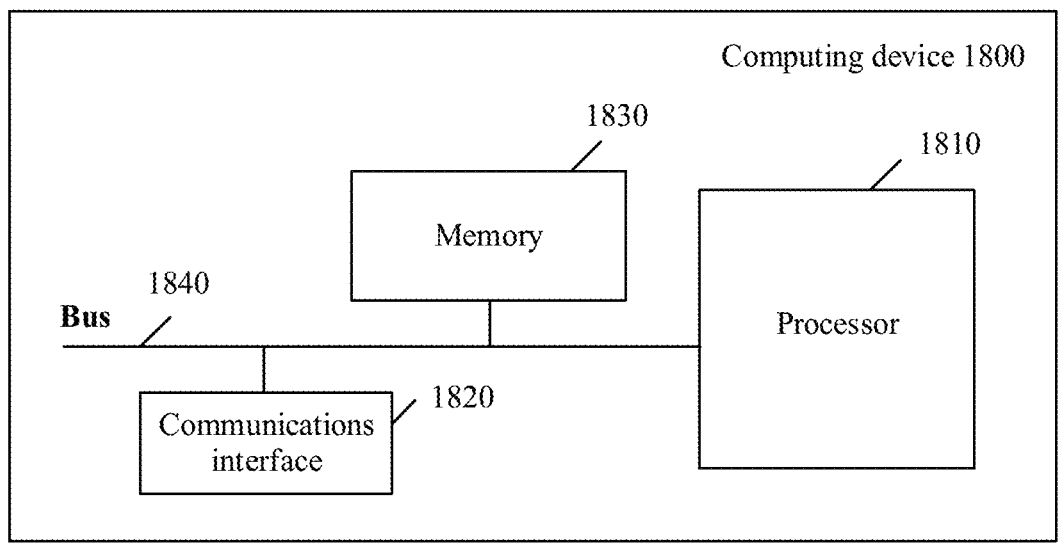
FIG. 18 is a schematic diagram of a hardware structure of a computing device according to this application.

FIG. 18 is a schematic diagram of a hardware structure of a computing device 1800 according to an embodiment of this application. The computing device 1800 may be the payment management node 141 in the embodiments in FIG. 1A to FIG. 17. As shown in FIG. 18, the computing device 1800 includes a processor 1810, a communications interface 1820, and a memory 1830. The processor 1810, the communications interface 1820, and the memory 1830 may be connected to each other using an internal bus 1840, or may implement communication using another means such as wireless transmission. In this embodiment of this application, that the processor 1110, the communications interface 1120, and the memory 1130 are connected to each other using the bus 1840 is used as an example. The bus 1840 may be a peripheral component interconnect (PCI) bus, an extended industry standard architecture (EISA) bus, or the like. The communications bus 1840 may be classified into an address bus, a data bus, a control bus, or the like. For ease of representation, only one bold line is used to represent the bus in FIG. 18, but this does not mean that there is only one bus or only one type of bus.

The processor 1810 may include at least one general-purpose processor, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or a combination thereof. The processor 1810 executes various types of digital storage instructions, for example, software or firmware programs stored in the memory 1830, such that the computing device 1800 can provide various services.

The memory 1830 is configured to store program code, and the processor 1810 controls execution of the program code, to perform the processing steps of the account management node in any embodiment in FIG. 1A to FIG. 16. The program code may include one or more software modules. The one or more software modules may be the software modules provided in the embodiment in FIG. 17, such as a receiving module, a recording module, an obtaining module, and a sending module. The receiving module is configured to receive an order and a device identity that are sent by a cloud application instance. The recording module records a correspondence between the order and the device identity. The receiving module is further configured to receive an order obtaining request sent by a terminal device. The obtaining module is configured to obtain the order from the correspondence between the order and the device identity based on the device identity carried in an order obtaining request. The program code may be specifically used to perform step S810, step S830 and step S840, step S860 and step S870, and optional steps thereof in the embodiment in FIG. 8, step 16, step 20 to step 22, step 27 and step 28, and optional steps thereof in the embodiment in FIG. 9A and FIG. 9B, and may be further configured to perform other steps performed by the payment management node described in the embodiments in FIG. 1A to FIG. 15. Details are not described herein again.

It should be noted that this embodiment may be implemented using a general-purpose physical server, for example, an ARM server or an X86 server, or may be implemented using a virtual machine implemented based on a general-purpose physical server based on an NFV technology. The virtual machine means a complete computer system that is simulated using software and that has a complete hardware system function and runs in an isolated environment. This is not specifically limited in this application.

The memory 1830 may include a volatile memory, such as a random-access memory (RAM). Alternatively, the memory 1830 may include a non-volatile memory, such as a read-only memory (ROM), a flash memory, a hard disk drive (HDD), or a solid-state drive (SSD). Alternatively, the memory 1830 may include a combination of the foregoing types of memories. The memory 1830 may store program code, and may specifically include program code used to perform the steps performed by the payment management node described in the embodiments in FIG. 1A to FIG. 15. Details are not described herein again.

The communications interface 1820 may be a wired interface (for example, an Ethernet interface), an internal interface (for example, a peripheral component interconnect express (PCIe) interface), a wired interface (for example, an Ethernet interface), or a wireless interface (for example, a cellular network interface or a wireless local area network interface) that is configured to communicate with another device or module.

It should be noted that FIG. 18 is only a possible implementation of this embodiment of this application. During actual application, the computing device may alternatively include more or fewer components. This is not limited herein. For content that is not shown or not described in this embodiment of this application, refer to related descriptions in the embodiments in FIG. 1A to FIG. 15. Details are not described herein again.

It should be understood that the payment management node provided in this application may alternatively be a server cluster including at least one server. Each server in the server cluster may be implemented by the computing device shown in FIG. 18. This is not specifically limited in this application.

Figure 19:
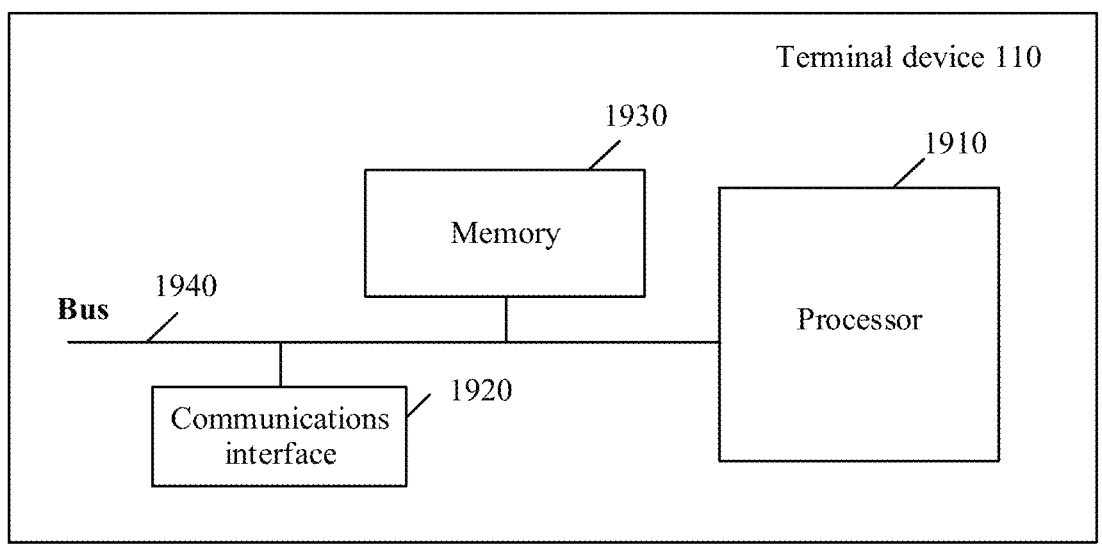
FIG. 19 is a schematic diagram of a hardware structure of a terminal device according to this application.

FIG. 19 is a schematic diagram of a hardware structure of a terminal device 110 according to an embodiment of this application. As shown in FIG. 19, the terminal device 110 includes a processor 1910, a communications interface 1920, and a memory 1930. The processor 1910, the communications interface 1920, and the memory 1930 may be connected to each other using an internal bus 1940, or may implement communication using another means such as wireless transmission. In this embodiment of this application, that the processor 1210, the communications interface 1220, and the memory 1230 are connected to each other using the internal bus 1940 is used as an example. The bus 1940 may be a PCI bus, an EISA bus, or the like. The communications bus 1940 may be classified into an address bus, a data bus, a control bus, or the like. For ease of representation, only one bold line is used to represent the bus in FIG. 19, but this does not mean that there is only one bus or only one type of bus.

The processor 1910 may include at least one general-purpose processor, for example, a CPU, or a combination of a CPU and a hardware chip. The hardware chip may be an ASIC, a PLD, or a combination thereof. The PLD may be a CPLD, an FPGA, a GAL, or any combination thereof. The processor 1910 executes various types of digital storage instructions, for example, software or firmware programs stored in the memory 1930, such that the terminal device 110 can provide a wide variety of services.

The memory 1930 is configured to store program code, and the processor 1910 controls execution of the program code, to perform the processing steps of the terminal device in any embodiment in FIG. 1A to FIG. 15. The program code may include one or more software modules. The one or more software modules may be the software modules provided in the embodiment in FIG. 16, for example, a receiving module, an obtaining module, a processing module, and an establishment module. The establishment module is configured to establish a connection channel to a cloud application instance, and obtain a device identity of a cloud application instance from the connection channel. The receiving module is configured to receive an order payment request sent by the cloud application instance. The obtaining module is configured to send, to a payment management node based on the order payment request, an order obtaining request carrying the device identity of the cloud application instance. The processing module is configured to process the order, and may be specifically configured to perform step S820 and step S830, step S850, and optional steps thereof in the embodiment in FIG. 8, and step 18 to step 22, step 24 to step 26, and optional steps thereof in the embodiment in FIG. 5A and FIG. 5B, and may be further configured to perform other steps performed by the terminal device described in the embodiments in FIG. 1A to FIG. 15. Details are not described herein again.

The memory 1930 may include a volatile memory such as a RAM. Alternatively, the memory 1930 may include a non-volatile memory such as a ROM, a flash memory, an HDD, or an SSD. Alternatively, the memory 1930 may include a combination of the foregoing types of memories. The memory 1930 may store program code, and may specifically include program code used to perform other steps described in the embodiments in FIG. 1A to FIG. 15. Details are not described herein again.

The communications interface 1920 may be a wired interface (for example, an Ethernet interface), an internal interface (for example, a PCIe interface), a wired interface (for example, an Ethernet interface), or a wireless interface (for example, a cellular network interface or a wireless local area network interface) that is configured to communicate with another device or module.

It should be noted that FIG. 19 is only a possible implementation of this embodiment of this application. During actual application, the terminal device may alternatively include more or fewer components. This is not limited herein. For content that is not shown or not described in this embodiment of this application, refer to related descriptions in the embodiments in FIG. 1A to FIG. 15. Details are not described herein again.

An embodiment of this application further provides a computer-readable storage medium. The computer-readable storage medium stores instructions. When the instructions are run on a processor, the method procedures shown in FIG. 1A to FIG. 15 are implemented.

An embodiment of this application further provides a computer program product. When the computer program product runs on a processor, the method procedures shown in FIG. 1A to FIG. 15 are implemented.

All or some of the foregoing embodiments may be implemented by software, hardware, firmware, or any combination thereof. When software is used to implement embodiments, the foregoing embodiments may be implemented completely or partially in a form of a computer program product. The computer program product includes at least one computer instruction. When the computer program instructions are loaded and executed on a computer, all or some of the procedures or functions according to embodiments of the present disclosure are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating at least one usable medium. The usable medium may be a magnetic medium (for example, a floppy disk, a hard disk drive, or a magnetic tape), an optical medium (for example, a high-density digital video disc (DVD), or a semiconductor medium. The semiconductor medium may be an SSD.

The foregoing descriptions are merely specific implementations of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A payment system, comprising:
   a payment management node;
   an application service node comprises at least one of a video application server, a social application server, or a virtual reality application server;
   a payment platform selected by a user;
   a terminal device configured to be communicatively coupled to the payment management node; and
   a cloud application instance configured to be communicatively coupled to the payment management node, the application service node, the payment platform, and the terminal device, wherein the cloud application instance is configured to:
   send, to the payment management node, an order and a device identity corresponding to the cloud application instance, wherein the device identity is a unique character string; and
   send, to the terminal device, an order payment request and the device identity,
   wherein the terminal device is further configured to send, to the payment management node and based on the order payment request, an order obtaining request carrying the device identity,
   wherein the payment management node is configured to:
   record a correspondence between the order and the device identity;
   obtain, based on the order obtaining request carrying the device identity, the order from the correspondence; and
   send the order to the terminal device, and
   wherein the terminal device is further configured to:
   receive the order;
   process the order;
   display the order;
   obtain an identity of the payment platform;
   obtain a payment account and a payment password of the user on the payment platform; and
   send, to the payment management node, the identity of the payment platform, the payment account, and the payment password, wherein the payment management node is further configured to send, to the payment platform, the payment account, the payment password, a payment collection account, and a price of a selling object that are recorded in the order, wherein the payment platform is configured to:
    verify the payment account based on the payment password; and
    subsequent to successfully verifying the payment account:
        deduct fees from the payment account; and
        send first payment success information to the payment management node, wherein the payment management node is further configured to send second payment success information to the application service node, and wherein the application service node is configured to:
    record, based on the second payment success information, that the order has taken effect; and
    notify the cloud application instance that the order has taken effect.

2. The payment system of claim 1, wherein the cloud application instance is further configured to establish a connection channel to the terminal device before sending the order and the device identity to the payment management node, and wherein the terminal device is further configured to obtain the device identity via the connection channel.

3. The payment system of claim 1, wherein the cloud application instance comprises a virtual machine.

4. The payment system of claim 1, wherein the application service node comprises a game server.

5. The payment system of claim 1, wherein the terminal device comprises a mobile phone, a tablet computer, a personal computer, a smart television, or a game console.

6. The payment system of claim 1, wherein the payment system is configured to process a payment corresponding to the order without the cloud application instance receiving payment-related information of the user.

7. The payment system of claim 1, wherein the cloud application instance comprises a container or a bare metal server.

8. A payment method comprising:
    sending, from a cloud application instance to a payment management node, an order and a device identity corresponding to the cloud application instance, wherein the device identity is a unique character string;
    sending, from the cloud application instance to a terminal device, an order payment request and the device identity;
    sending, from the terminal device to the payment management node and based on the order payment request, an order obtaining request carrying the device identity;
    recording, by the payment management node, a correspondence between the order and the device identity;
    obtaining, by the payment management node based on the order obtaining request carrying the device identity, the order from the correspondence;
    sending, by the payment management node, the order to the terminal device;
    receiving, by the terminal device, the order;
    processing, by the terminal device, the order;
    displaying, by the terminal device, the order;
    obtaining, by the terminal device, an identity of a payment platform;
    obtaining, by the terminal device, a payment account and a payment password of a user on the payment platform;
    sending, from the terminal device to the payment management node, the identity of the payment platform, the payment account, and the payment password;
    sending, from the payment management node to the payment platform, the payment account, the payment password, a payment collection account, and a price of a selling object that are recorded in the order;
    verifying, by the payment platform, the payment account based on the payment password;
    subsequent, by the payment platform, to successfully verifying the payment account:
        deducting fees from the payment account; and
        sending first payment success information to the payment management node; sending, by the payment management node, second payment success information to an application service node;
    recording, by the application service node based on the second payment success information, that the order has taken effect; and
    notifying, by the application service node, the cloud application instance that the order has taken effect,
    wherein the application service node comprises at least one of a video application server, a social application server, or a virtual reality application server.

9. The payment method of claim 8, further comprising:
    establishing, by the cloud application instance, a connection channel to the terminal device before sending the order and the device identity to the payment management node; and
    obtaining, by the terminal device, the device identity via the connection channel.

10. The payment method of claim 8, wherein the cloud application instance comprises a virtual machine.

11. The payment method of claim 8, wherein the application service node comprises a game server.

12. The payment method of claim 8, wherein the terminal device comprises a mobile phone, a tablet computer, a personal computer, a smart television, or a game console.

13. The payment method of claim 8, wherein the payment method is configured to process a payment corresponding to the order without the cloud application instance receiving payment-related information of the user.

14. The payment method of claim 8, wherein the cloud application instance comprises a container or a bare metal server.

* * * * *